US006799110B2

(12) United States Patent
Hashimoto et al.

(10) Patent No.: US 6,799,110 B2
(45) Date of Patent: Sep. 28, 2004

(54) ENGINE CONTROL SYSTEM

(75) Inventors: Kohji Hashimoto, Tokyo (JP); Katsuya Nakamoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 128 days.

(21) Appl. No.: 10/127,725

(22) Filed: Apr. 23, 2002

(65) Prior Publication Data

US 2003/0100975 A1 May 29, 2003

(30) Foreign Application Priority Data

Nov. 28, 2001 (JP) .................................... P2001-363093

(51) Int. Cl.[7] .......................... G06F 7/00; G06F 19/00; G06F 17/00

(52) U.S. Cl. ............................ 701/62; 701/29; 701/51; 701/54; 123/332; 123/337; 123/397; 123/399; 123/198 D; 477/20; 700/54; 700/71; 700/79

(58) Field of Search .............................. 701/29, 33–35, 701/51, 53, 54, 62–64; 477/20; 700/54, 71, 75, 79, 304; 123/319, 332, 337, 396, 397, 399, 198 D

(56) References Cited

U.S. PATENT DOCUMENTS

| | | | | | |
|---|---|---|---|---|---|
| 4,940,030 | A | * | 7/1990 | Morikawa | 123/198 D |
| 5,260,877 | A | | 11/1993 | Drobny et al. | 701/114 |
| 5,601,063 | A | | 2/1997 | Ohashi et al. | 123/396 |
| 5,614,666 | A | * | 3/1997 | Hara et al. | 73/118.1 |
| 6,175,788 | B1 | * | 1/2001 | Hasegawa et al. | 701/29 |
| 6,290,309 | B1 | * | 9/2001 | Korn | 303/122.05 |
| 6,379,279 | B1 | * | 4/2002 | Miyamoto | 477/87 |
| 6,390,044 | B2 | * | 5/2002 | Yoshizawa et al. | 123/90.17 |
| 6,411,872 | B1 | * | 6/2002 | Fujita et al. | 701/29 |
| 6,491,022 | B2 | * | 12/2002 | Okamoto | 123/396 |
| 2002/0022917 | A1 | * | 2/2002 | Frohlich et al. | 701/62 |
| 2002/0026271 | A1 | * | 2/2002 | Ebashi | 701/62 |

FOREIGN PATENT DOCUMENTS

| | | | | | |
|---|---|---|---|---|---|
| EP | 569227 | A1 * | 11/1993 | | F02D/41/22 |
| EP | 908611 | A2 * | 4/1999 | | F02D/11/10 |
| JP | 2-176141 | | 7/1990 | | F02D/41/22 |
| JP | 6-137206 | | 5/1994 | | F02D/45/00 |
| JP | 6-229301 | | 8/1994 | | F02D/41/22 |
| JP | 6-278502 | | 10/1994 | | B60K/31/00 |
| JP | 10318026 | A * | 12/1998 | | F02D/41/22 |
| JP | 11-2152 | | 1/1999 | | F02D/45/00 |
| JP | 11-141389 | | 5/1999 | | F02D/45/00 |
| JP | 2000-97087 | | 4/2000 | | F02D/41/22 |
| JP | 2000116095 | A * | 4/2000 | | H02K/26/00 |
| JP | 2000314329 | A * | 11/2000 | | F02D/13/02 |
| JP | 2001323821 | A * | 11/2001 | | F02D/9/02 |
| JP | 2003148237 | A * | 5/2003 | | F02D/45/00 |

OTHER PUBLICATIONS

US Pub. No. 2002/0032511 A1 to Murakami et al.*

* cited by examiner

*Primary Examiner*—Anthony Knight
*Assistant Examiner*—Crystal J. Barnes
(74) *Attorney, Agent, or Firm*—Sughrue Mion, PLLC

(57) ABSTRACT

Evacuation operation performance is improved when any abnormality occurs in an electronic throttle control system.

When any serious abnormality occurs, a first abnormality storage element (133) operates, a load relay for a power supply circuit (104*a*) of a throttle valve open/close controlling motor (103) is de-energized to operate a first alarm and display (109*a*). Thus a first device carries out the evacuation operation by a fuel cut control.

When any slight abnormality occurs, a second abnormality storing element (136) comes to actuate thereby a second alarm and display (109*b*) being operated. Thus a second device carries out the evacuation operation using together a throttle valve opening control by the motor 103 and the fuel cut control.

18 Claims, 15 Drawing Sheets

ENGINE CONTROL SYSTEM

BACKGROUND OF THE INVENTION

1. Field of the Invention

The present invention relates to an electronic control system of an intake amount for an engine that is used in an engine control unit (ECU) for carrying out an ignition control, a fuel injection control and the like of an automobile engine, particularly in a composite type ECU in which an electronic throttle control function for controlling a throttle valve opening by means of an electric motor is added, and in which safety of the additional function and evacuation operation performances under abnormal state are improved.

2. Background Art

An electronic throttle control system for controlling a throttle valve opening for an intake of an engine in accordance with a depression degree of an accelerator pedal using an electric motor has been widely put into practical use. Recently a wireless type that does not have any accelerator wire has been coming into wide use.

This type of electronic throttle control system is arranged such that when a power supply for the electric motor is interrupted upon occurrence of any abnormality, the throttle valve is automatically returned to a predetermined safe throttle valve opening position by a default mechanism employing a return spring.

The above-described safe throttle valve opening is set to be at a valve opening position a little larger than an idle operating valve opening position. And evacuation operation is carried out in the form of one pedal operation conducting a creep travelling while regulating the depression degree of the brake pedal.

However, in the case that the above-described safe throttle valve opening is small, a problem exists in that even if the brake is released, any sufficient drive force cannot be obtained, and therefore any hill climbing evacuation operation cannot be carried out. On the contrary, in the case that the safe throttle valve opening is excessively large, there arises a dangerous state of having difficulty in stopping the vehicle in spite of sufficiently depressing the brake pedal.

Further, it is necessary to take into consideration such a problem that a default return is not carried out properly due to a mechanical trouble in the throttle valve opening control.

To cope with such problems as described above, a prior art employed a technical improvement as shown in FIGS. 17*a* to 17*d*.

FIG. 17*a* shows an evacuation operation method in the case that a motor or a throttle valve open/close mechanism is abnormal, and the throttle valve is returned to the valve opening position below a predetermined default position.

In the drawing, reference numeral 1*a* designates threshold setting means for the upper limit (supremum) vehicle speed, and numeral 1*b* designates vehicle speed detecting means. Numeral 2*a* designates threshold setting means for an idle engine speed, and numeral 2*b* designates engine speed detecting means of the engine. Numerals 3*a*, 3*b* designate return detecting switches for the accelerator pedal. Numeral 4 designates supply fuel control means for controlling a fuel injection amount, and numeral 5 designates a fuel injection valve. When the accelerator pedal is returned, the fuel amount is controlled by the supply fuel control means 4 so that the engine speed may be not more than the threshold value set by the threshold value setting means 2*a*. Thus the drive force of the engine comes to be in a minimum state.

Furthermore when the accelerator pedal is depressed, the fuel amount is controlled by the supply fuel control means 4 so that the vehicle speed may be not more than the threshold value set by the threshold value setting means 1*a*.

However, in this prior art, the throttle valve opening is so small that a sufficient vehicle speed cannot be obtained. To the utmost, it is a driving function at a lowermost limit intending to get out of the trouble spot.

The operation control system shown in FIG. 17*a* is disclosed in the Japanese Patent Publication (unexamined) No. 97087/2000, titled “Throttle Valve Control System” (Reference 1). This operation control system is suitably applied when the throttle valve opening at the time of stopping the motor is not more than the default opening. During the accelerator pedal being depressed, the engine speed is not limited and therefore this operation method is suitable for a low-speed hill climbing evacuation operation.

As a further characteristic of this prior control system a two-pedal operation system is employed based on the generally accepted conception that acceleration is to be conducted by means of the accelerator pedal, and the deceleration is to be conducted by means of the brake pedal. However, a most serious problem exists in this type of control system that the accelerator pedal cannot perform a function of proportionally increasing or decreasing the vehicle speed or engine speed.

The operation control system shown FIG. 17*b* is applied to the above-described Example 1, in which under the abnormal state that the throttle valve opening at the time of stopping the motor is not less than the default opening. In this operation system, the supply fuel control means 4 is controlled in such a manner that the engine speed may be not more than the threshold value set by the upper limit engine speed setting means 2*c*.

On the other hand, in the region of a low engine speed, output torque of the engine increases in proportion to the engine speed, and proportional constant thereof increases or decreases substantially in proportion to the throttle valve opening.

Accordingly, a problem exists in this type of control system that even if the upper limit engine speed is regulated so as to be not more than the threshold value, the actual throttle valve opening is indefinite, and that engine drive torque is varied depending upon the valve opening. Further there is a possibility that braking by means of the brake pedal becomes difficult in the case of large valve opening.

Therefore, supposing that the upper limit threshold engine speed might be lowered, any sufficient drive force cannot be obtained. In particular, a problem exists in that the hill climbing evacuation travelling cannot be carried out at all in the case of small valve opening.

The operation system shown in FIG. 17*c* is disclosed, besides in the foregoing Example 1, in the Japanese Patent Publication (unexamined) No. 176141/1990 titled “Control System for Internal Combustion Engine” (Example 2), the Japanese Patent Publication (unexamined) No. 141389/1999 titled “Throttle Control System of Internal Combustion Engine” (Example 3), the Japanese Patent Publication (unexamined) No. 229301/1994 titled “Output Control System of Internal Combustion Engine” (Example 4), etc. This operation is a typical evacuation operation method in the case that the motor or the throttle valve open/close mechanism is in the normal state.

In the drawing, numeral 6*a* designates an accelerator position sensor (referred to as APS) that detects the degree of the depression of the accelerator pedal. Numeral 7 designates target throttle valve opening setting means in response to the output detected by the APS. Numeral 6*b* designates a throttle position sensor (referred to as TPS) that detects the throttle valve opening in cooperation with an open/close controlling motor 9 for the throttle valve. Numeral 8 designates PID control means for controlling the above-described motor 9 so that the target throttle valve opening set by the setting means 7 may coincide with an actual valve opening by means of the throttle position sensor 6*b*. The arrangement described above is the same as that under the normal operation.

However, in the case of occurring any other abnormality except in the motor or the drive mechanism, the target throttle valve opening set by the setting means 7 is a restrained value as compared with that under the normal operation.

In the case of the above-described Example 2, there is proposed abnormality detecting means for detecting an abnormality in output voltage level, abnormality of sudden change, abnormality in relative comparison, etc. in the accelerator position sensor and the throttle position sensor which are provided in the form of dual system. Upon occurring any of these abnormalities, the target throttle valve opening is suppressed.

In the case of the above-described Example 3, acceleration suppression means 10 is used after the setting means 7. As a characteristic thereof, this operation is controlled such that the actual throttle valve opening increases gradually even if the target valve opening increases sharply, and such that the actual throttle opening comes to be small upon decreasing the target valve opening.

In this type, the evacuation operation is a usual two-pedal operation, which is characterized in that there is no uncomfortable feeling. However, a problem exits in that drive torque of the engine becomes decreased due to the target valve opening being suppressed, whereby any sufficient hill climbing performance cannot be obtained.

In particular, a problem exits in that any technique of identifying non-defective, wherein if one of the abnormality determination means such as APS or TPS is in failure, the other one is automatically selected, is not employed. A further problem exits in that the suppression of the target valve opening is not carried out in a rational and quantitative manner.

FIG. 17*d* shows a method of the evacuation operation in the case that the motor or the throttle valve open/close mechanism is abnormal, while the accelerator position sensor is effective. This operation method is shown in the above-described Example 4.

In the drawing, numeral 2*d* designates operation threshold setting means for variably setting the upper limit engine speed substantially in proportion to the output detected by the accelerator position sensor 6*a*. The supply fuel control means 4 controls the fuel injection valve 5 such that the actual engine speed may be equal to the threshold value.

A characteristic of the system shown in Example 4 is that in the case of an actuator system being in the normal state, the evacuation operation as shown in FIG. 17*c* is performed. On the other hand, in the case of the actuator system being in the abnormal state, the evacuation operation as shown in FIG. 17*d* is performed. In either case, the two-pedal operation, which is comfortable for the driver, is carried out.

In this drawing, however, what sort of evacuation operation is to be carried out in the case that the accelerator position sensor is in failure, is not shown. Particularly, supposing that the output voltage detected by the accelerator position sensor might be excessively large when the accelerator pedal is returned to its position, there may arise a dangerous state difficult to stop by means of the brake pedal.

In the Japanese Patent Publication (unexamined) No. 137206/1994 titled "Electronic Control System for Engine" (Example 5), a still further concept is proposed. In this proposal, operation of the target valve opening is carried out by means of both CPU 1 for the fuel control and CPU 2 for the valve opening control. The target valve opening of the CPU 1 is used as a substitution in the case of occurring an abnormality such as sum check error in the target valve opening signal of the CPU 2.

In addition, also in the case of the foregoing Example 5, it is described that the evacuation operation is carried out in the following manner. That is, when the CPU 2 for the valve opening control or the actuator is in abnormal state, such evacuation operation as shown in FIG. 17*d* is performed if the accelerator position sensor is normal. On the other hand, such evacuation operation as shown in FIG. 17*b* is performed if one of a pair of accelerator position sensors is abnormal.

(1) Description about Problems Incidental to the Prior Arts

In the prior arts as discussed above, the abnormality detecting means for the added electronic throttle control system and the evacuation operation method in accordance with the abnormality detecting means are not systematically associated. Therefore, a problem exits in that even when the actuator system and the accelerator position sensor are normal, an engine torque generated at the time of evacuation operation is restrained, eventually resulting in lowering of a climbing performance. Another problem exists in that when the actuator system and the accelerator position sensor are abnormal, braking by means of the brake pedal becomes difficult or any sufficient drive force is not secured.

Furthermore, when it is determined that the actuator system is abnormal while the accelerator position sensor is normal, a problem exits in that braking by means of the brake pedal becomes difficult as long as there is any abnormality in the accelerator position sensor.

SUMMARY OF THE INVENTION

A first object of the present invention is to systematically extract any abnormality in sensor system, control system and actuator system to divide them into a serious abnormality and a slight abnormality, and then provide various evacuation operation means corresponding to the abnormality state.

A second object of the invention is to make it possible to perform a two-pedal evacuation operation safely in the same feeling as in normal operation using an accelerator pedal and a brake pedal, even when there is any abnormality in the actuator system or throttle position sensor so long as the control system and accelerator position sensor are regarded as being normal.

A third object of the invention is to make it possible to perform a one-pedal evacuation operation by means of the brake pedal safely, even when there is no accelerator position sensor regarded as being non-defective and, moreover, any default return abnormality of the actuator is generated.

To accomplish the foregoing objects, an engine control system according to the invention includes: motor drive control means that is power fed via a power supply switch from a vehicle-mounted battery and controls an open/close driving motor of a throttle valve for an intake of the engine in response to an output from an accelerator position sensor for detecting a degree of a depression of an accelerator pedal and an output from a throttle position sensor for detecting a throttle valve opening; fuel injection control means for the engine; and engine speed or vehicle speed detecting means; and includes a microprocessor (CPU);

the engine control system including multi-stage abnormality detecting means, multi-stage evacuation operation means, and evacuation operation mode selection means;

wherein the abnormality detecting means is multi-stage abnormality detecting means that regularly monitors operations of sensor system, control system and actuator system relating to a throttle valve control, and identifies and detects slight abnormality and serious abnormality depending on whether or not at least control of the actuator is possible;

the evacuation operation means is multi-stage evacuation operation means that responds to any abnormality result detected by the multi-stage abnormality detecting means, and comprises at least slight abnormality evacuation operation means and serious abnormality evacuation operation means; and the evacuation operation mode selection means is means for selecting one of the multi-stage evacuation operation means so that shift from a normal operation when the slight abnormality or serious abnormality is not generated, to a side of getting worse in abnormality degree toward the slight abnormality evacuation operation or the serious abnormality evacuation operation may be possible, while shift to a return side in the abnormality degree may be impossible without interrupting the power supply switch.

As described above, in the engine control system according to the invention, one of the multi-stage operation means in response to multi-stage degrees of abnormality, i.e., serious abnormality, slight abnormality and the normality, can be selected and operated. Furthermore, in the case that the abnormality degree is changed, the shift of the operation means toward the side of getting worse the abnormality degree is possible, while the shift to the side of restoring the abnormality degree is impossible without interrupting the power supply switch. As a result of such arrangement, an advantage is obtained such that safe driving can be done, and there is no confusion in the driving operation.

DESCRIPTION OF THE PREFERRED EMBODIMENTS

Embodiment 1.

(1) Detailed Description of Arrangement of Embodiment 1

Figure 1:
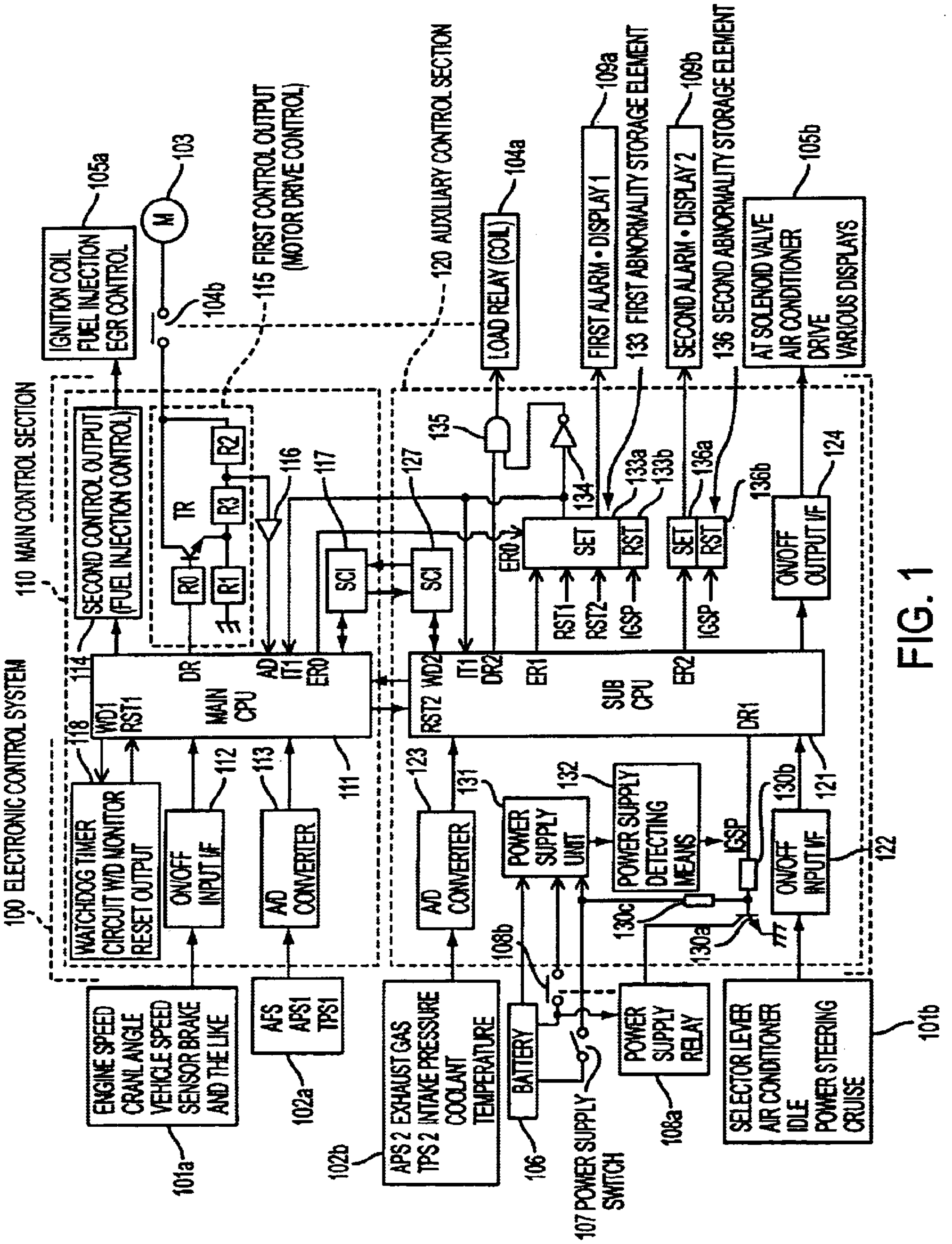
FIG. 1 is a block diagram showing an arrangement of an engine control system according to Embodiment 1 of the invention.

FIG. 1 showing a block diagram of arrangement of a system according to one preferred embodiment of the present invention is hereinafter described.

In FIG. 1, reference numeral 100 designates an electronic control system for an intake amount of an engine that is comprised of a main control section 110 including a main CPU 111 and an auxiliary control section 120 including a sub CPU 121. This electronic control system is connected to an external input and output device via a connector not shown. First, external elements of this system are hereinafter described.

Numeral 101*a* designates a first ON/OFF signal input group comprised of an engine speed sensor, a crank angle sensor, a vehicle speed sensor, etc. These input signals include an input signal for conducting a high speed and a high frequency operation in which frequency of ON/OFF is high or it is necessary to immediately fetch its operation into the CPU, and an input signal such as brake switch signal in order to safely maintain an engine speed control at a minimum limit even when the sub CPU 121 is in an abnormal state.

Numeral 101*b* designates a second ON/OFF signal input group comprised of a selection position sensor of a shift lever for transmission, an air conditioner switch, a return position detecting switch for an accelerator pedal, a power steering operation switch, a constant-speed traveling cruise switch, etc. These input signals include an input signal at a low speed and a low frequency operation in which it does not matter much that there is any delay in read response of the ON/OFF operation.

Numeral 102*a* designates a first analog sensor input group comprised of an air flow sensor AFS for measuring an intake amount of a throttle, a first accelerator position sensor APS1 for measuring a depression of the accelerator pedal, a first throttle position sensor TPS1 for measuring a throttle valve opening, etc. Numeral 102*b* designates a second analog sensor input group comprises of a second accelerator position sensor APS2, a second throttle position sensor TPS2, an exhaust gas sensor, a coolant temperature sensor, an intake pressure sensor, etc. The above-described APS1 and APS2, or the above-described TPS1 and TPS2 are to be provided in the form of double system in view of safety.

Numeral 103 designates a motor that controls open/close of the throttle valve. Numeral 104*a* designates a load relay that conducts power supply/interruption for the above-described motor 103 by means of an output contact 104*b*. When this load relay is operated, the power supply circuit for the motor 103 is to be broken.

Numeral 105*a* designates an output group related to an engine driving device such as an engine ignition coil, a fuel injection solenoid valve, an exhaust gas circulation combusting solenoid valve (or a stepping motor), etc. Numeral 105*b* designates an output group related to a peripheral auxiliary device such as a transmission stage switching solenoid valve for the transmission, an air conditioner driving electromagnetic clutch, various displays, etc. Numeral 106 designates a vehicle-mounted battery. Numeral 107 designates a power supply switch such as an ignition switch. Numeral 108*a* designates a power supply relay that includes an output contact 108*b* and power fed from the vehicle-mounted battery 106. Numerals 109*a*, 109*b* are first and second alarm and displays.

Next in the above-described main control section 110, numeral 112 designates an input interface connected between the first ON/OFF signal input group 101*a* and the main CPU 111. Numeral 113 designates an analog/digital converter connected between the first analog sensor input group 102*a* and the main CPU 111. Numeral 114 designates an interfacing power transistor circuit for carrying out the ON/OFF of the driving device 105*a* as a second control output that the main CPU111 generates. Numeral 115 designates an interfacing power transistor circuit for carrying out the ON/OFF of the motor 103 as a first control output that the main CPU111 generates. Numeral 116 designates a motor current detecting amplifier. An output from this amplifier 116 is supplied to an AD input of the main CPU111. Further the amplifier 116 is arranged such that an actuator system error output ERO is generated when a motor current is not less than a predetermined value (short circuit) at the time of a control output DR being ON, or when there is no disconnection detecting leak current (disconnection) at the time of the control output DR being OFF. In this manner, the disconnection and short circuit of the circuit wired for the motor is to be detected at the same time.

In addition, referring to an internal arrangement of the interface circuit 115, TR designates a transistor that is driven by means of a DR output from the main CPU via a base resistance RO. Numeral R1 designates a current detection resistance provided at an emitter circuit of the above-described transistor. R2 and R3 are voltage dividing resistances of a high resistance connected between an emitter and a collector of the above-described transistor TR. An input terminal of the above-described current detecting amplifier 116 is connected between the voltage dividing resistances R2 and R3.

Accordingly, when the transistor TR is brought to a conduction under the state of the output contact 104*b* being ON, the motor current flows from the vehicle-mounted battery 106 via the motor 103, the output contact 104*b*, the transistor TR and the current detection resistance R1. Thus a voltage drop generated at the current detection resistance R1 is detected by means of the amplifier 116.

On the other hand, when the transistor TR is not brought to a conduction, a slight leak current flows via the vehicle-mounted battery 106, the motor 103, the output contact 104*b*, the voltage dividing resistances R2 and R3 and the current detection resistance R1. Thus a voltage drop generated at the voltage dividing resistance R3 and the current detection resistance R1 is detected by means of the amplifier 116.

As a result, if the input of the amplifier 116 when the transistor TR is in conduction is excessively large, the short circuit abnormality at the motor 103 or the external wiring will be detected. On the other hand, if the input of the amplifier 116 when the transistor TR is not in conduction is excessively small, the open-circuit abnormality at the motor 103 or the external wiring will be detected.

Numeral 117 as well as numeral 127 designates a serial interface constituted of a series/parallel converter for conducting exchange of a serial signal between the main CPU111 and the sub CPU121 in cooperation therebetween.

Numeral 118 designates a watch dog timer circuit that monitors a watch dog signal WD1 of the main CPU111 and produces a first reset output RST1 to cause the main CPU111 to start again when a pulse train of a predetermined time width is not generated.

Next in the above-described auxiliary control section 120, numeral 122 designates an input interface connected between the second ON/OFF signal input group 101*b* and the sub CPU121. Numeral 123 designates an analog/digital converter connected between the second analog sensor input group 102*b* and the sub CPU121. Numeral 124 designates an interfacing power transistor circuit for conducting ON/OFF of the peripherally auxiliary device 105*b* as a third control output that the sub CPU121 intermediates. The ON/OFF signal of the above-described second ON/OFF signal input group 101*b* is subjected to a noise filter processing within the sub CPU121 and thereafter transmitted to the main CPU111 via the serial interfaces 127, 117. Further the main CPU111 produces a third control output and transmits this output to the sub CPU121 via the serial interfaces 117, 127.

Furthermore, a digital conversion value of the analog signal by means of the second analog sensor input group 102*b* is transmitted to the main CPU111 via the sub CPU121 and the serial interfaces 127, 117.

Numeral 130*a* designates a transistor that drives the above-described power supply relay 108*a*. Numeral 130*b* designates a drive resistance that causes the transistor 130*a* to be turned ON by the control output DR1 from the sub CPU121. Numeral 130*c* designates a drive resistance that causes the transistor 130*a* to be turned ON from the power supply switch 107. Numeral 131 designates a power supply unit that is operated by a sleeping power supply directly power fed from the vehicle-mounted battery 106 and by an operative power supply power fed via the power supply switch 107 or the output contact 108*b* of the power supply relay 108*a*. The power supply unit 131 supplies a predetermined stabilizing constant voltage to each circuit within the main control section 110 or the auxiliary control section 120. Numeral 132 designates power supply detecting means for generating a pulse output IGSP of a short time when the power supply switch 107 is turned on or off. The above-described power supply relay 108*a* is energized via the drive resistance 130*c* and the transistor 130*a* when the power supply switch 107 is circuit-closed, and the output contact 108*b* thereof is circuit-closed.

Accordingly, even when the power supply switch 107 is circuit-opened, the operation of the power supply relay 108*a* is continuously maintained by means of the drive resistance 130*b* until the control output DR1 of the sub CPU121 is OFF. During this time period, a save processing of each CPU or an origin return operation of the actuator is carried out.

Numeral 133 designates a first abnormality storage element that includes a set input section 133*a* and a reset input section 133*b*. Numeral 134 designates negative logical (NOT) element against a SET output from this abnormality storage element. Numeral 135 designates a gate element connected between the control output DR2 from the sub CPU121 and the load relay 104*a*. When the first alarm and display 109*a* is driven due to the generation of the above-described SET output and the gate element 135 is closed via the inverter logic element 134, the load relay 104*b* is de-energized even if the sub CPU121 produces the control output DR2.

In addition, the main CPU111 is arranged so as to monitor the watchdog signal WD2 of the sub CPU121 and produce a second reset output RST2 to start the sub CPU121 again when the pulse train of a predetermined time width is not generated. Further the above-described first abnormality storage element 133 is arranged so as to be set by an actuator system error output ERO, a first reset output RST1 and a second reset output RST2 that the main CPU111 produces, and an error output ER1 that the sub CPU121 produces, and to be reset by a pulse output IGSP that the power supply detecting means 132 produces.

Contents of the above-described error outputs ER0, ER1 will be described later referring to FIGS. 5 to 7.

Numeral 136 designates a second abnormality storage element that includes a set input section 136*a* set by an error output ER2 from the sub CPU121 and a reset input section 136*b* reset by the pulse output IGSP from the power supply detecting means 132. Numeral 109*b* designates a second alarm and display that is driven by the set output from the abnormality storage element 136.

Figure 2:
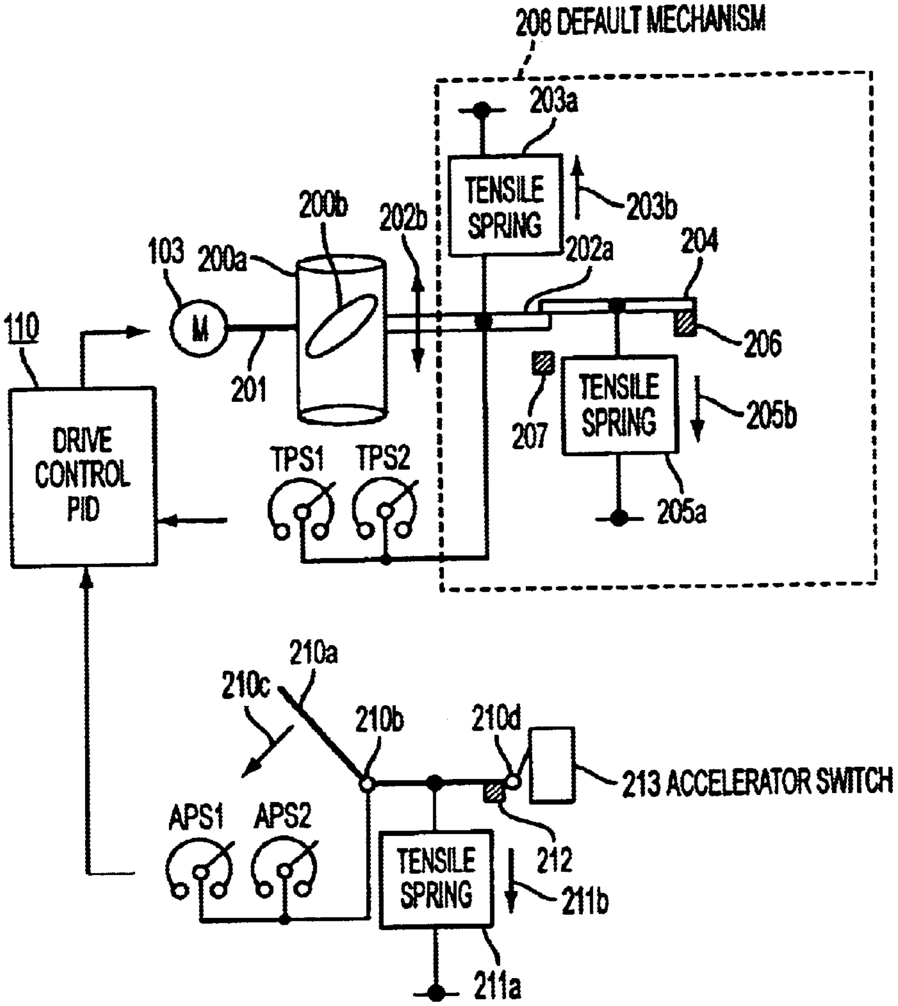
FIG. 2 is a schematic diagram to explain a mechanism of which essential part is an actuator according to Embodiment 1 of the invention.

FIG. 2 showing a schematic diagram to explain a mechanism in which essential part is the actuator according to Embodiment 1 of the invention is hereinafter described.

In FIG. 2, numeral 200*a* designates an intake throttle including a throttle valve 200*b*. Numeral 201 designates a rotary shaft of the motor 103 that controls the open/close of the throttle valve 200*b*. Numeral 202*a* designates a direct coupled oscillating part interlocking with the rotary shaft 201, and in the drawing this rocking part 202*a* is illustrated so as to vertically move in the direction of an arrow 202*b* for reasons of better understanding.

Numeral 203*a* designates a tensile spring that gives an impetus to the above-described direct coupled oscillating part 202*a* in the direction of an arrow 203*b* (valve-opening direction). Numeral 204 designates a return member that is given an impetus in the direction of an arrow 205*b* (a valve-closing direction) by means of a tensile spring 205*a*, and overcomes the above-described tensile spring 203*a* to return the direct coupled oscillating part 202*a* in the valve-closing direction. Numeral 206 designates a default stopper that regulates a return position of the return member 204. Numeral 207 designates an idle stopper coming in contact when the return member 204 drives the direct coupled oscillating part 202*a* further toward the valve-closing direction from the return sate of the return member 204 to the position of the default stopper 206. The above-described motor 103 is arranged so as to control the valve-opening operation against the tensile spring 203*a* from the default position to the idle stopper 207. The motor 103 further conducts a valve-opening control against the tensile spring 205*a* in cooperation with the tensile spring 203*a* for the valve-opening operation beyond the default position.

Accordingly, when the power supply for the motor 103 is interrupted, the direct coupled oscillating part 202*a* carries out the valve-closing or opening operation up to the position regulated by means of the default stopper 206 under the action of the tensile springs 205*a*, 203*a*. This position serves as a valve opening position for the evacuation operation in the abnormal state.

However, in the case that there is any abnormality in the gear mechanism and when occurring any actuator abnormality that cannot return to the targeted default position, it should be assumed that there is a possibility of locking at a position of enormously large valve opening.

In addition, the first and second throttle position sensors TPS1 and TPS2 are disposed so as to detect an operation position of the direct coupled oscillating part 202*a*, that is, a valve opening of the throttle.

Numeral 208 designates a default mechanism that is constituted of the tensile springs 203*a*, 205*a*, the direct coupled oscillating part 202*a*, the return member 204, the default stopper 206, etc.

Numeral 210*a* designates an accelerator pedal that is depressed in the direction of an arrow 210*c* about a fulcrum 210*b*. Numeral 210*d* designates a coupling member that is given an impetus in the direction of an arrow 211*b* by means of a tensile spring 211*a* and drives the above-described accelerator pedal 210*a* in the returning direction. Numeral 212 designates a pedal stopper that regulates the return position of the accelerator pedal 210*a*. Numeral 213 designates an accelerator switch that detects the accelerator pedal 210*a* is not depressed, and returned to the position of the pedal stopper 212 by means of a tensile spring 211*a*. The first and second accelerator position sensors APS1 and APS2 are disposed so as to detect the degree of depression of the accelerator pedal 210*a*.

Additionally, a DC motor, a brushless motor, a stepping motor and the like are employed as the above-described motor 103. However, the DC motor that is proportionally ON/OFF controlled is utilized as the motor 103 herein. The control of the motor 103 is carried out by the main CPU111 in the main control section 110.

Figure 3:
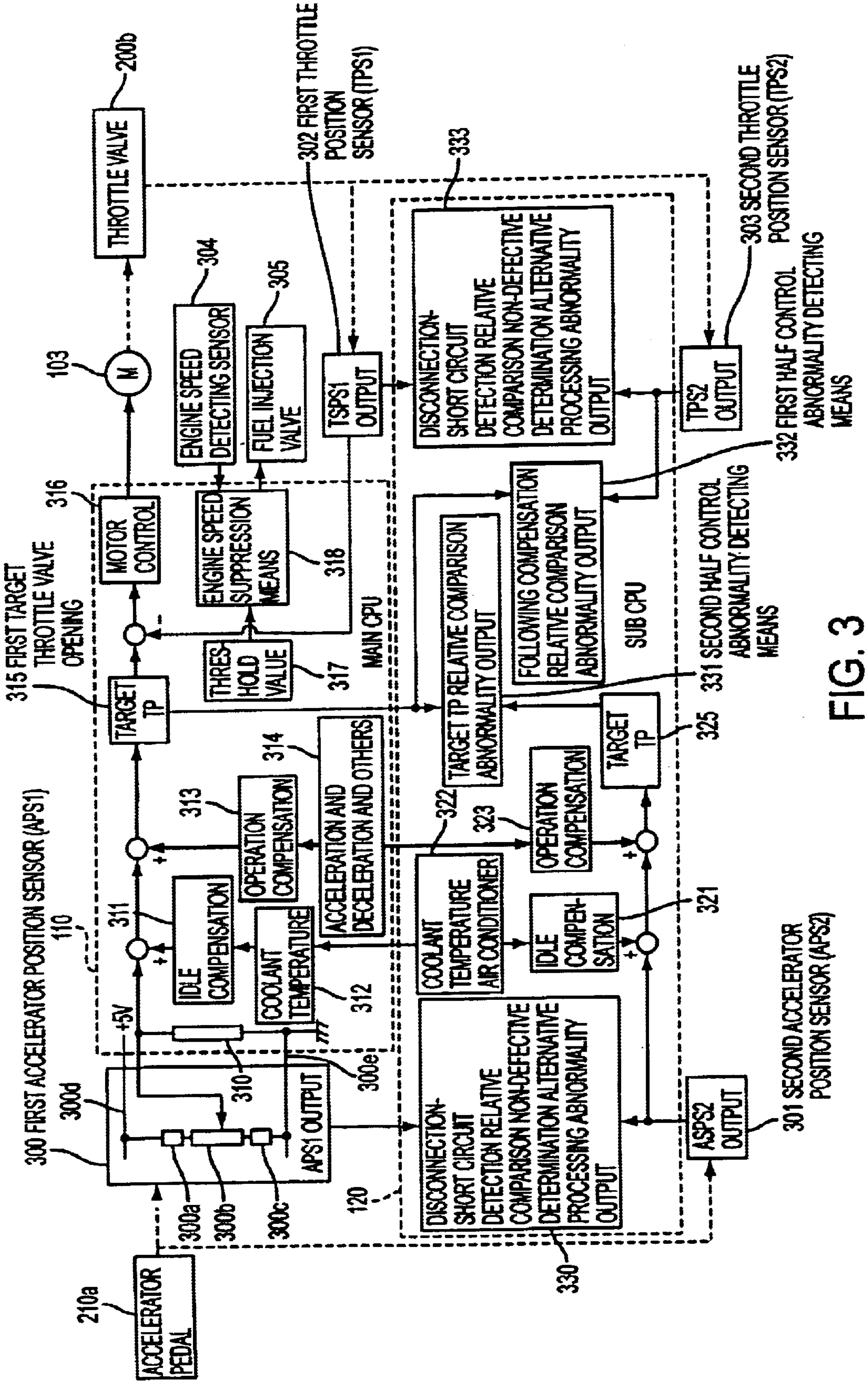
FIG. 3 is a block diagram of the entire engine control system according to Embodiment 1 of the invention.

FIG. 3 showing a block diagram of the entire engine control system according to Embodiment 1 of the invention is hereinafter described.

In FIG. 3, the first and second accelerator position sensors APS1 and APS2 interlocking with the accelerator pedal 210*a* are indicated by numerals 300 and 301. The first and second throttle position sensors TPS1 and TPS2 interlocking with the throttle valve 200*b* are indicated by numerals 302 and 303.

Internal arrangement of these sensors is described represented by the APS1 as being a typical one. A serial circuit comprised of a positive side resistance 300*a*, a variable resistance 300*b* and a negative side resistance 300*c* are connected between the positive and negative power supply lines 300*d* and 300*e* of a DC5V power supply. In this arrangement, any detected output is fetched from a sliding terminal of the above-described variable resistance 300*b*.

Therefore, the sensor is to be under the normal state when the output voltage therefrom is, for example, in the range of 0.2 to 4.8V. However, supposing that there might be any disconnection and short circuit in wiring or any contact failure in the variable resistance, it is possible that the voltage other than the range described above is outputted.

Referring to the main control section 110, numeral 310 designates a pull down resistance for causing the input signal voltage to be 0 when occurring any disconnection in the detection signal line, any contact failure in the variable resistance 300*b* or the like. Numeral 311 designates an idle compensation block for increasing an idle engine speed when an air conditioner is used or the engine coolant temperature is low. Numeral 312 designates a compensation factor signal for conducting such idle compensation. This compensation factor signal depends upon input information that is transmitted from the sub CPU121 to the main CPU111 via the serial interfaces 127, 117.

Numeral 313 designates an operation compensation block that increases or decreases a fuel supply in response to such a case as intending to increase the fuel supply for improving the acceleration upon rapid depression of the accelerator pedal 210*a*, or in response to such a case of intending to curb the fuel during stable constant-speed operation. Numeral 314 designates a compensation factor signal for conducting such operation compensation. The compensation factor signal is calculated in the main CPU111 based on depression speed of the accelerator pedal 210*a* (differential value of the output signal from the APS1) or any other various factors.

Numeral 315 designates a first target throttle valve opening that is computed in the main CPU111. This target value is a value obtained by algebraically adding an increase or decrease compensation value computed at the above-described idle compensation block 311 or the operation compensation block 313 to the output signal voltage of the APS1 in response to the degree of depression of the accelerator pedal 210*a*.

Numeral 316 designates a PID control section that ON/OFF controls the motor 103 proportionally so that the output signal voltage of the TPS1 in response to an actual throttle valve opening may coincide with the signal voltage of the above-described first target throttle valve opening.

Numeral 317 designates a threshold setting engine speed described later. Numeral 318 designates engine speed suppression means for suppressing the fuel supply to the fuel injection valve 305 so that the actual engine speed based on the engine speed detecting sensor 304 may be equal to the above-described threshold engine speed. This means is arranged to act when any abnormality in the throttle control system occurs as discussed later.

Referring to the auxiliary control section 120, numeral 321 designates an idle compensation block in order to increase the idle engine speed when the air conditioner is used or the engine coolant temperature is low. Numeral 322 designates a compensation factor signal for carrying out this idle compensation, and this compensation factor signal depends upon the input information directly inputted to the sub CPU121.

Numeral 323 designates an operation compensation block that increases or decreases the fuel supply in response to such a case as intending to increase the fuel supply for improving the acceleration upon rapid depression of the accelerator pedal 210*a*, or in response to such a case as intending to restrain the fuel during the stable constant-speed operation. The compensation factor signal with respect to this operation compensation block is calculated in the main CPU111 and transmitted to the sub CPU121 via the serial interfaces 117, 127.

In this respect, the depression speed of the accelerator pedal 210*a* is computed on the side of the sub CPU121 as a differential value of the output signal of the APS2. It is also preferable that any other various factors that can be calculated only in the main CPU111 is ignored at the sub CPU121, and an operation compensation base on the approximate computation is carried out.

Numeral 325 designates a second target throttle valve opening that is computed in the sub CPU121. This target value is a value obtained by algebraically adding an increase or decrease compensation value computed at the above-described idle compensation block 321 or the operation compensation block 323 to the output signal voltage of the APS2 in response to the degree of depression of the accelerator pedal 210*a*.

Numeral 330 designates sensor abnormality detecting means for detecting an abnormality in the first and second accelerator position sensors APS1 and APS2, and also serves as non-defective determination and alternative processing means. It is preferable that signal voltage detected by the APS1 is transmitted from the main CPU111 to the sub CPU121 via the serial interfaces 117, 127, or that the output voltage of the APS1 is also be directly inputted to the sub CPU121 in addition to the main CPU111.

Figure 4A:
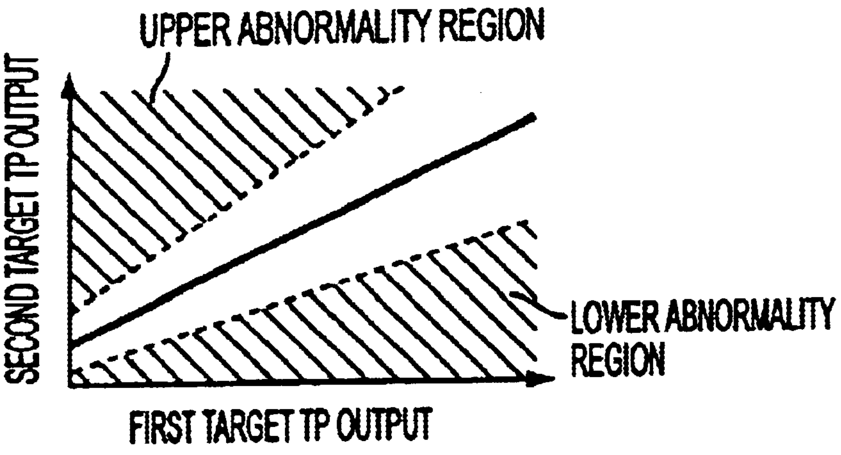
FIGS. 4 (*a*) and (*b*) are graphic diagrams each showing a control characteristic of the engine control system according to Embodiment 1 of the invention.

Numeral 331 designates first half control abnormality detecting means that acts when there is a difference of not less than a predetermined ratio, by comparing a signal voltage showing the first target throttle valve opening 315 transmitted from the main CPU111 to the sub CPU121 via the serial interfaces 117, 127 with the second target throttle valve opening 325 approximately computed in the sub CPU121. This first half control abnormality detecting means, as shown in FIG. 4*a*, determines whether or not the operation value of the second target throttle valve opening 325 is in the abnormal region with respect to the output signal voltage of the first target throttle valve opening 315.

Figure 4B:
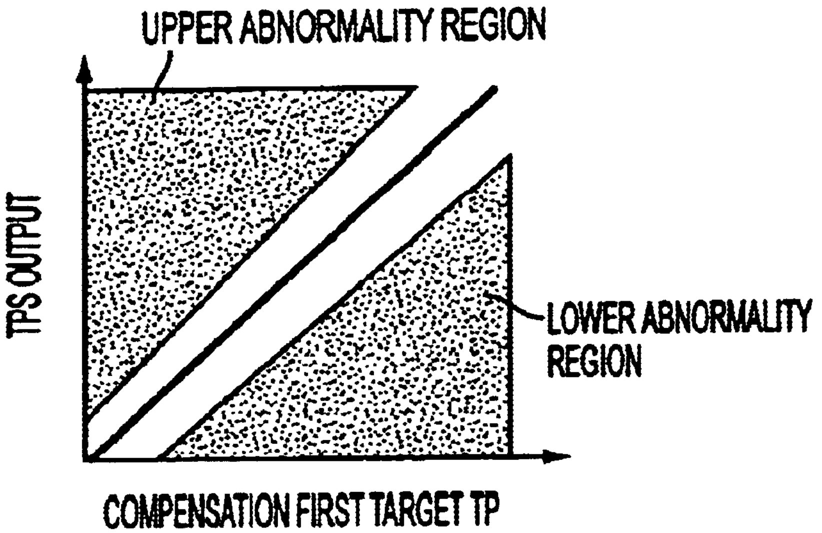

Numeral 332 designates second half control abnormality detecting means, which as shown in FIG. 4*b*, determines whether or not the actual throttle valve opening TPS2 is out of the abnormality region with respect to the compensation operation value of the first target throttle valve opening 315.

In addition, the above-described compensation operation is carried out by algebraically subtracting a value proportional to the differential value of the first target valve opening 315 therefrom. Then by carrying out the compensation assuming a response relay in the actuator, a transitional determination error will be reduced.

Numeral 333 designates, as described later referring to FIG. 6, sensor abnormality detecting means for detecting an abnormality of the first and second throttle position sensors TPS1 and TPS2, and also serves as non-defective selection and alternative processing means. The signal voltage detected by the TPS1 is transmitted from the main CPU111 to the sub CPU121 via the serial interfaces 127, 117. Alternatively, it is preferable that the output voltage of the TPS1 is directly inputted also to the sub CPU121 in addition to the main CPU111.

In addition, the sensor abnormality detecting means 330, 333 detects the abnormality in the input system. The means 331 detects the first half control abnormality until calculating the target throttle valve opening from the input signal. The means 332 detects the second half control abnormality from the target throttle valve opening to the actual feedback return signal voltage. It is to be noted that the second half control abnormality detecting means 332 performs the abnormality detection including the abnormality in the motor 103 or the actuator portion. For example, in the case that the throttle valve is locking due to a mechanical abnormality, the target throttle valve opening and the actual throttle valve opening will not be coincident to each other even if the normal control is carried out. Therefore the second half control abnormality detecting means 332 is to detect such abnormality.

(2) Detailed Description about Action and Operation of Embodiment 1

Figure 5:
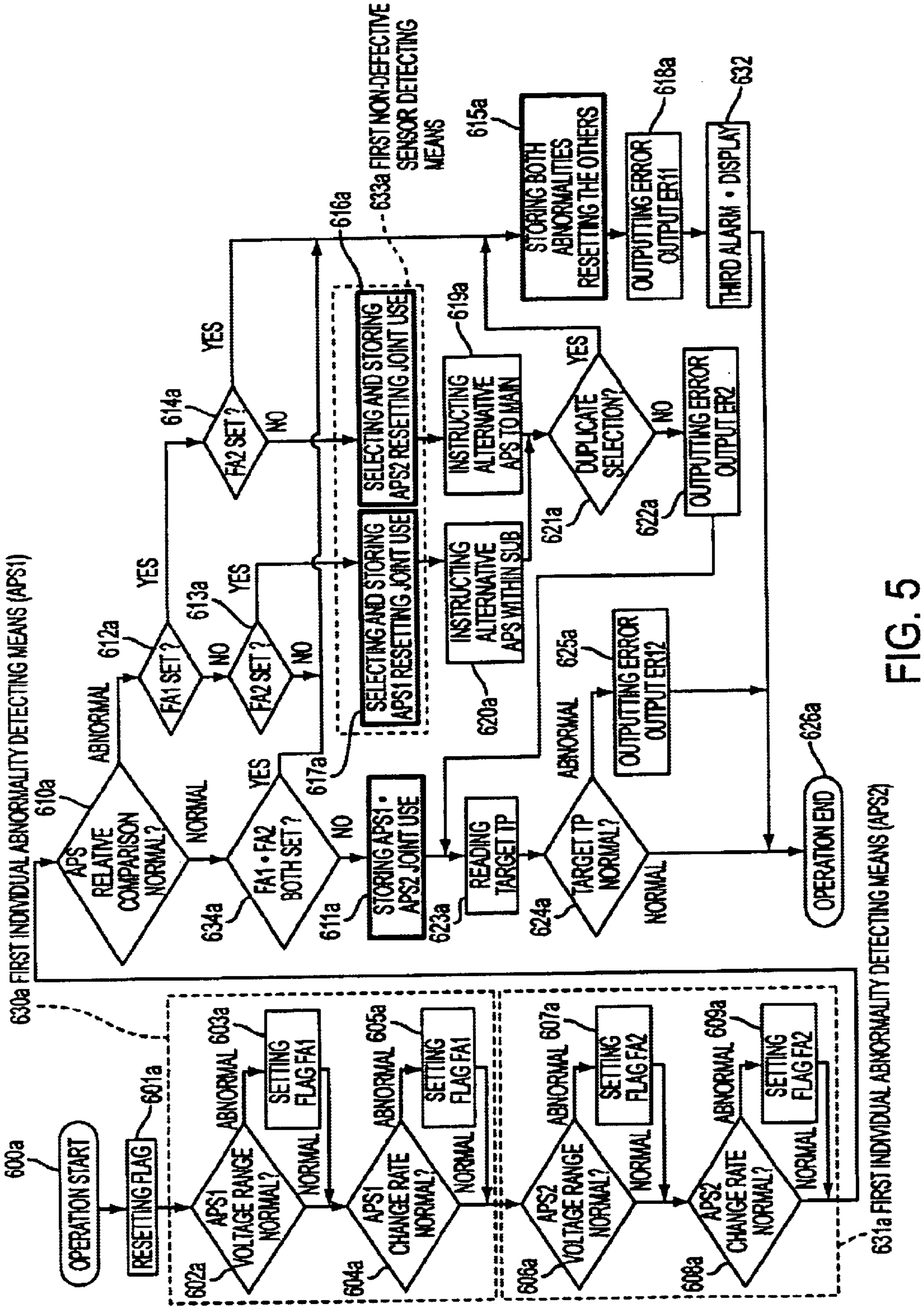
FIG. 5 is a flowchart to explain operation of the engine control system according to Embodiment 1 of the invention.

Regarding the system according to one embodiment of the invention arranged as shown in FIG. 1, first with reference to FIG. 5 showing an abnormality detection flowchart relating to the accelerator position sensor (APS), a method for generating the error output ER1 or ER2 by means of the sub CPU121 is hereinafter described.

In FIG. 5, numeral 600*a* is an operation start step that is activated regularly by interrupt operation. Numeral 601*a* is a step that operates subsequently to the operation start step and resets a flag FA1 or FA2 described later. Numeral 602*a* is a determination step that operates subsequently to the step, to determining an output voltage range abnormality of the APS1. In this determination step, the output voltage range is determined normal when the output voltage of the APS1 is 0.2 to 4.8V. This step is to determine whether or not there is any disconnection or contact failure in the detection signal line, or any short circuit error contact to the positive or negative power supply line or other different voltage wiring.

Numeral 603*a* is a step that acts when the determination step determines any abnormality and sets the flag FA1. Numeral 604*a* is a step that acts when the step 602*a* determines that the state is normal or setting of the flag in the step 603*a* is carried out, and conducts an abnormality determination related to a rate of change in the output voltage of the APS1. In this abnormality determination, rate of change is measured by a difference between the output voltage read last time and the output voltage read this time. Then in the case that the measurement shows a sharp change which is normally improbable, it will be determined that the abnormality is caused by any disconnection, short circuit or the like as above.

Numeral 605*a* is a step that acts when the step 604*a* determines any abnormality and sets the flag FA1. Numeral 630*a* is first individual abnormality detecting means relating to the APS1 which includes the steps 602*a* to 605*a*. Numeral 631*a* is first individual abnormality detecting means relating to the APS2 which includes similarly the steps 606*a* to 609*a*. The above-described step 606*a* acts when the step 602*a* determines that the state is normal or setting of the flag in the step 603*a* is carried out. For example, numeral 608*a* is a step that acts when the step 606*a* determines that the state is normal or setting of the flag in the step 607*a* is carried out, and conducts an abnormality determination related to a rate of change in the output voltage of the APS2.

Numeral 610*a* is first relative abnormality detecting means that acts when the step 602*a* determines that the state is normal or setting of the flag in the step 603*a* is carried out. This means 610*a* carries out a relative comparison to determine whether or not both of the output voltages of the APS1 and APS2 are coincident within a predetermined range of error, and determines that the state is abnormal when the error is large. Numeral 611*a* is a step that acts when the step 610*a* determines that the state is normal and, in the step 634*a* following this step, both FA1 and FA2 are not set, to store that both APS2 and APS2 are normal. Numeral 612*a* is a determination step that determines whether or not the flag FA1 is set in the step 630*a* or in the step 605*a*, proceeds to a step 613*a* when the flag is not set, while proceeds to a step 614*a* when the flag is set. Numerals 613*a* and 614*a* are determination steps that determine whether or not the flag FA2 is set in the step 607*a* or in the step 609*a*. When both step 612*a* and step 614*a* determine YES (both APS1 and APS2 are individually abnormal), or when both step 612*a* and step 613*a* determine NO (when neither APS1 nor APS2 is individually abnormal, but they are relatively abnormal), such state of both abnormalities is stored in the step 615*a*. In the subsequent step 618*a*, an error output ER11 is generated, and further in subsequent step 632*a* third alarm and/or display not shown are operated.

Furthermore, also in the case that it is determined that both flags FA1 and FA2 are set in the step 634*a*, such a state of both abnormalities is stored in the above-described step 615*a*.

In addition, the step 615*a* is performed by both abnormality detecting means of the APS. When the state of both abnormalities is stored in this step, storage information in the steps 611*a*, 616*a*, 617*a*, etc. is reset, while the storage in the step 615*a* is not reset until the power supply is turned OFF.

Further, the storage states in the steps 611*a*, 616*a*, 617*a* are reset even if the power supply is turned OFF.

Numeral 616*a* is a step that acts when the step 610*a* determines any relative abnormality, the step 612*a* determines YES (individual abnormality of the APS1) and the step 614*a* determines NO (APS2 is not individually abnormal), selects and stores the APS2 and resets the step 611*a*. Numeral 617*a* is a step that acts when the step 610*a* determines any relatively abnormal, the step 612*a* determines NO (APS1 is not individually abnormal) and the step 613*a* determines YES (APS2 is individually abnormal), selects and stores the APS1, and resets the step 611*a*. Numeral 633*a* is first non-defective sensor detecting means that includes the step 616*a* or the step 617*a*

Numeral 619*a* is a step that acts subsequently to the step 616*a* and issues an alternative APS command to the main CPU 111 so as to use the signal of the APS2 as a substitute of the APS1. Numeral 620*a* is a step that acts subsequently to the step 617*a* and issues an alternative APS command so as to use the signal of the APS1 as a substitute of the APS2 at the computation in the sub CPU 121. Numeral 621*a* is a determination step that stores the both abnormalities in the step 615*a* as a duplicate selection abnormality in the case that both step 616*a* and step 617*a* select and store the APS2 and the APS1 respectively. Further this determination step 621*a* generates an error output ER2 which is output by outputting step 622*a* in the case that one of the APS2 and APS1 is selected.

The step 623*a* acts subsequently to the step 611*a* or the step 622*a*, and is a step wherein the first target throttle valve opening 315 that is computed in the main CPU 111 is read into the sub CPU 121. A step 624*a* following the step is a determination step that is equivalent to the first half control abnormality detecting means 331 in FIG. 3. Further, as described above, this determination step 624*a* compares values of the first target throttle valve opening 315 and the second target throttle valve opening 325, and when they are deviated by not less than a predetermined error, determines that the state is abnormal. Numeral 625*a* is a step that generates the error output ER12 when this step determines that the first half control is abnormal. Numeral 626*a* is an end step when the step 624*a* determines that the state is normal, or following the step 625*a* and the step 632, and in this end step, waiting is required until the operation start step 600*a* is activated.

In addition, the error outputs ER11 and ER12 are logical OR-coupled to an error output ERF13, and are outputted as the error output ER1 from the sub CPU121 shown in FIG. 1.

Further, the error output ER21 is logical OR-coupled to error outputs ER22, ER23, and is outputted as the error output ER2 from the sub CPU121 shown in FIG. 1.

In effect the flow in FIG. 5 is summarized as follows. The error output ER11 is generated as both abnormalities of the APS1 and APS2 when both APS1 and APS2 are individually abnormal, or when there is any relative abnormality even if neither of them is individually abnormal and it cannot be identified which one is normal. When one of the APS1 and APS2 is individually abnormal even if there is any relative abnormality in them, the other is regarded as being normal, the non-defective selection is carried out, and the error output ER21 is generated. At the same time, when the APS1 is determined abnormal for example, in the main CPU of FIG. 1, the alternative processing is carried out so as to use the signal of the APS2 transmitted from the sub CPU 121 in place of the APS1.

Furthermore, the first half control abnormality determined by the step 624*a* is mainly caused by the operation error in the main CPU111 or the sub CPU121 since the abnormality of the APS1 and APS2 has been removed. On the supposition that such abnormality might be a temporary abnormality due to any noise or the like, by once stopping a vehicle and turning on the power supply switch again, the error output ER2 representing a serious abnormality is released.

Figure 6:
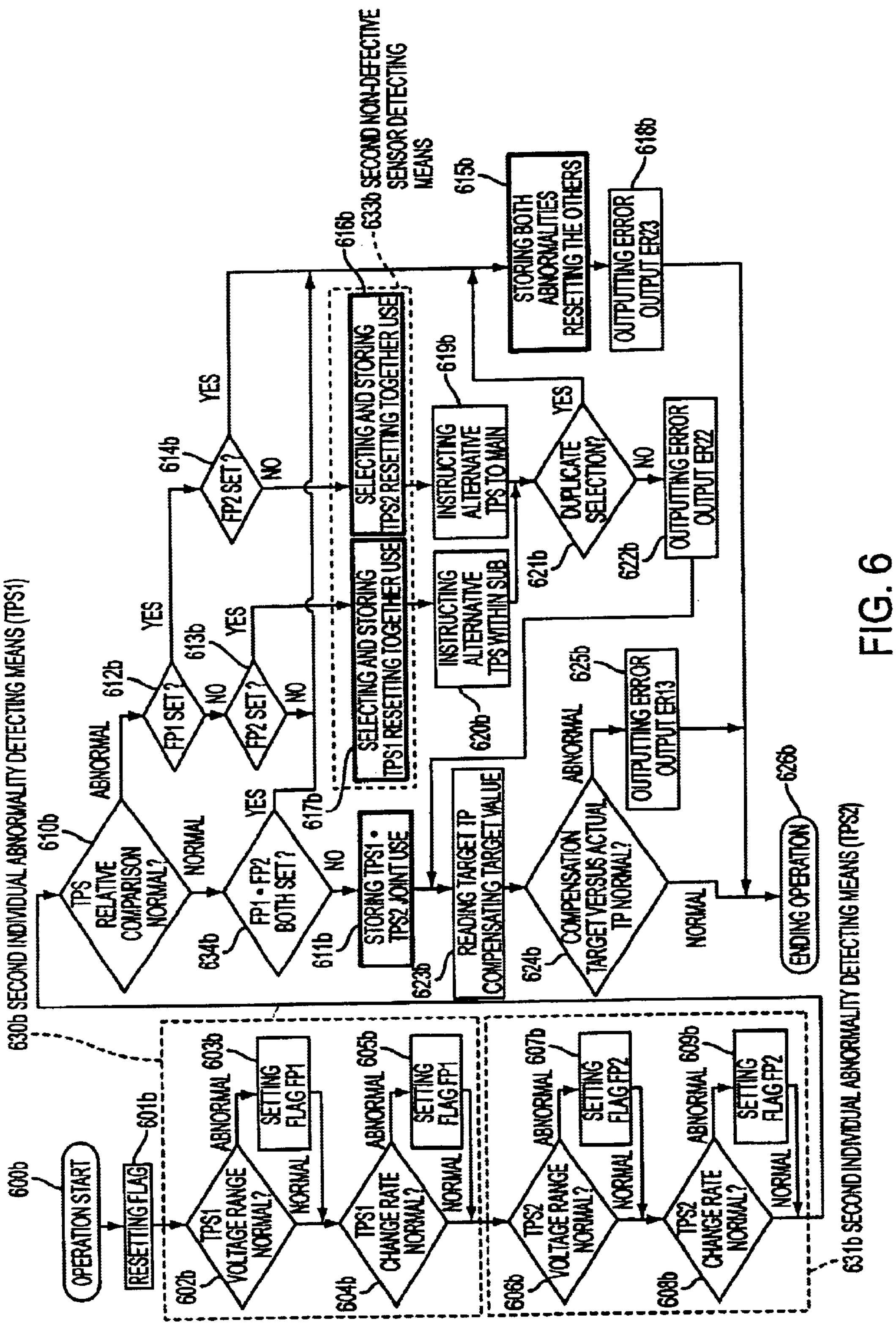
FIG. 6 is a flowchart to explain operation of the engine control system according to Embodiment 1 of the invention.

Now, with reference to FIG. 6 showing the abnormality detection flowchart relating to the throttle position sensor (TPS), a generation method for generating the error output ER1 or ER2 by means of the sub CPU121 is described.

In FIG. 6, numeral 600*b* is an operation start step that is activated by the interrupt operation at regular intervals. Numeral 601*b* is a step that operates subsequently to the operation start step 600*b* and resets the flag FP1 and FP2 as described later. Numeral 602*b* is a determination step for determining the output voltage range abnormality in the TPS1 that operates following the step 601*b*. This determination step 602*b* determines that the state is normal when the output voltage is 0.2 to 4.8V. Further, the determination step 602*b* determines whether or not there is any disconnection or contact failure in the detection signal line, or any short circuit error contact to the positive or negative power supply line or other different voltage wiring.

Numeral 603*b* is a step that acts when this determination step determines any abnormality and sets the flag FP1. Numeral 604*b* is a step that acts when the step 602*b* determines that the state is normal or setting of the flag in the step 603*b* is carried out, and conducts the abnormality determination concerning the rate of change in the output voltage of the TPS1. In this abnormality determination, the rate of change is measured by the difference between the output voltage read last time and that read this time. Then in the case that the measurement shows a sharp change which is normally improbable, it will be determined that the abnormality is caused by any disconnection, short circuit or the like as above.

Numeral 605*b* is a step that acts when the step 604*b* determines any abnormality and sets the flag FP1. Numeral 630*b* is second individual abnormality detecting means relating to the TPS1 that includes the steps 602*b* to 605*b*. Numeral 631*b* is second individual abnormality detecting means relating to the TPS2 that includes similarly the step 606*b* to the step 609*b*. The above-described step 606*b* acts when the step 604*b* determines that the state is normal, or when the setting of the fag is carried out in the step 605*b*.

Numeral 610*b* is second relative abnormality detecting means that acts when the step 608*b* determines that the state is normal or when the flag is set in the step 609*b*. In this step 610*b*, it is relatively compared whether or not both of the output voltages of the TPS1 and TPS2 are coincident within a predetermined error, and determines that the state is abnormal when the error is large. Numeral 611*b* is a step that acts when the step 610*b* determines that the state is normal and the step 634*b* following this step does not set both the FP1 and FP2, and stores that both TPS1 and TPS2 are in normal state. Numeral 612*b* is a determination step that determines whether or not the flag FP1 is set in the step 603*b* or 605*b*, proceeds to the step 613*b* in the case that the flag FP1 is not set, while proceeds to the step 614*b* in the case that it is set. Numerals 613*b* and 614*b* are determination steps that determine whether or not the flag FP2 is set in the step 607*b* or 609*b*. In these determination steps, both abnormalities are stored in the step 615*b* when both step 612*b* and step 614*b* determine YES (both TPS1 and TPS2 are individually abnormal), or when both step 612*b* and step 613*b* determine NO (neither TPS1 nor the TPS2 is individually abnormal, but relatively abnormal). Then the error output ER23 is generated in the subsequent step 618*b*.

Furthermore, also in the case that it is determined that both flags FP1 and FP2 are set in the step 634*b*, the both abnormalities are stored in the above-described step 615*b*.

In addition, the step 615*b* includes both abnormality detecting means. When the state of both abnormalities is stored in this step, storage information in the steps 611*b*, 616*b*, 617*b* is reset, while the storage in the step 615*b* is not reset until the power supply is turned OFF.

On the other hand, the storage in the steps 611*b*, 616*b*, 617*b* is reset even if the power supply is turned OFF.

Numeral 616*b* is a step that acts when the step 610*b* determines any relative abnormality, the step 612*b* determines YES (individual abnormality of the TPS1) and the step 614*b* determines NO (the TPS2 is not individually abnormal), selects and stores the TPS2, and resets the step 611*b*. Numeral 617*b* is a step that acts when the step 610*b* determines any relative abnormality, the step 612*b* determines NO (the TPS1 is not individually abnormal) and the step 613*b* determines YES (the TPS2 is individually abnormal), selects and stores the TPS1, and resets the step 611*b*. Numeral 633*b* is second non-defective sensor detecting means that includes the step 616*b* or the step 617*b*.

Numeral 619*b* is a step that acts subsequently to the step 616*b*, and issues an alternative TPS command to the main CPU so as to use the signal of the TPS2 in place of the TPS1. Numeral 620*b* is a step that acts subsequently to the step 617*b*, and issues the alternative TPS command so as to use the signal of the TPS1 in place of the TPS2 at the computation in the sub CPU121. Numeral 621*b* is a determination step that stores the both abnormalities in the step 615 as the duplicate selection abnormality in the case that the step 616*b* and the step 617*b* select and store the TPS2 and TPS1 respectively. Further, in the case of selecting one of them, this determination step issues the error output ER22 in the step 622*b*.

The step 623*b* is a step that acts subsequently to the step 611*b* or the step 622*b*, and reads into the sub CPU121 the first target throttle valve opening 315 computed at the main CPU111. Further this step calculates a compensation target value by algebraically subtracting a differential value of the first target throttle valve opening 315 therefrom. The step 624*b* following the step is a determination step that is equivalent to the second half control abnormality detecting means 332 shown in FIG. 3. Further, as described above, in this step 623*b*, by comparing a compensation value with respect to the first target throttle valve opening 315 with a value of the actual throttle valve opening TPS1 or the TPS2, when the compared values are deviated by not less than a predetermined error, then the state is determined abnormal. Numeral 625*b* is a step that generates the error output ER13 when this step determines the second half control abnormality. Numeral 626*b* is an operation end step when the step 624*b* determines that the state is normal, or subsequent to the steps 625*b*, 618*b*. In this end step, waiting is required until the operation start step 600*b* is activated.

Further, the error output ER13 is logical OR-coupled to the error outputs ER11, ER12 shown in FIG. 5, and outputted as the error output ER1 of the sub CPU121 shown in FIG. 1.

Furthermore, the error outputs ER22 and ER23 are logical OR-coupled to the error output ER21 shown in FIG. 5, and outputted as the error output ER2 of the sub CPU121 shown in FIG. 1.

In effect the flow in FIG. 6 is summarized as follows. The error output ER23 is generated as both abnormalities of the TPS1 and TPS2 when both TPS1 and TPS2 are individually abnormal, or when there is any relative abnormality even if neither of them is individually abnormal and it cannot be identified which one is normal. When one of the TPS1 and TPS2 is individually abnormal even if there is any relative abnormality in them, the other is regarded as being normal, the non-defective selection is carried out, and the error output ER22 is generated. At the same time, when the TPS1 is determined abnormal for example, in the main CPU of FIG. 1, the alternative processing is carried out so as to use the signal of the TPS2 transmitted from the sub CPU 121 in place of the TPS1.

Furthermore, the second half control abnormality determined by the step 624*a* is mainly caused by the operation error in the main CPU111 or the sub CPU121 since the abnormality of the TPS1 and TPS2 has been removed. On the supposition that such abnormality might be a temporary abnormality due to any noise or the like, by once stopping a vehicle and turning on the power supply switch again, the error output ER13 representing a serious abnormality is released.

Figure 7:
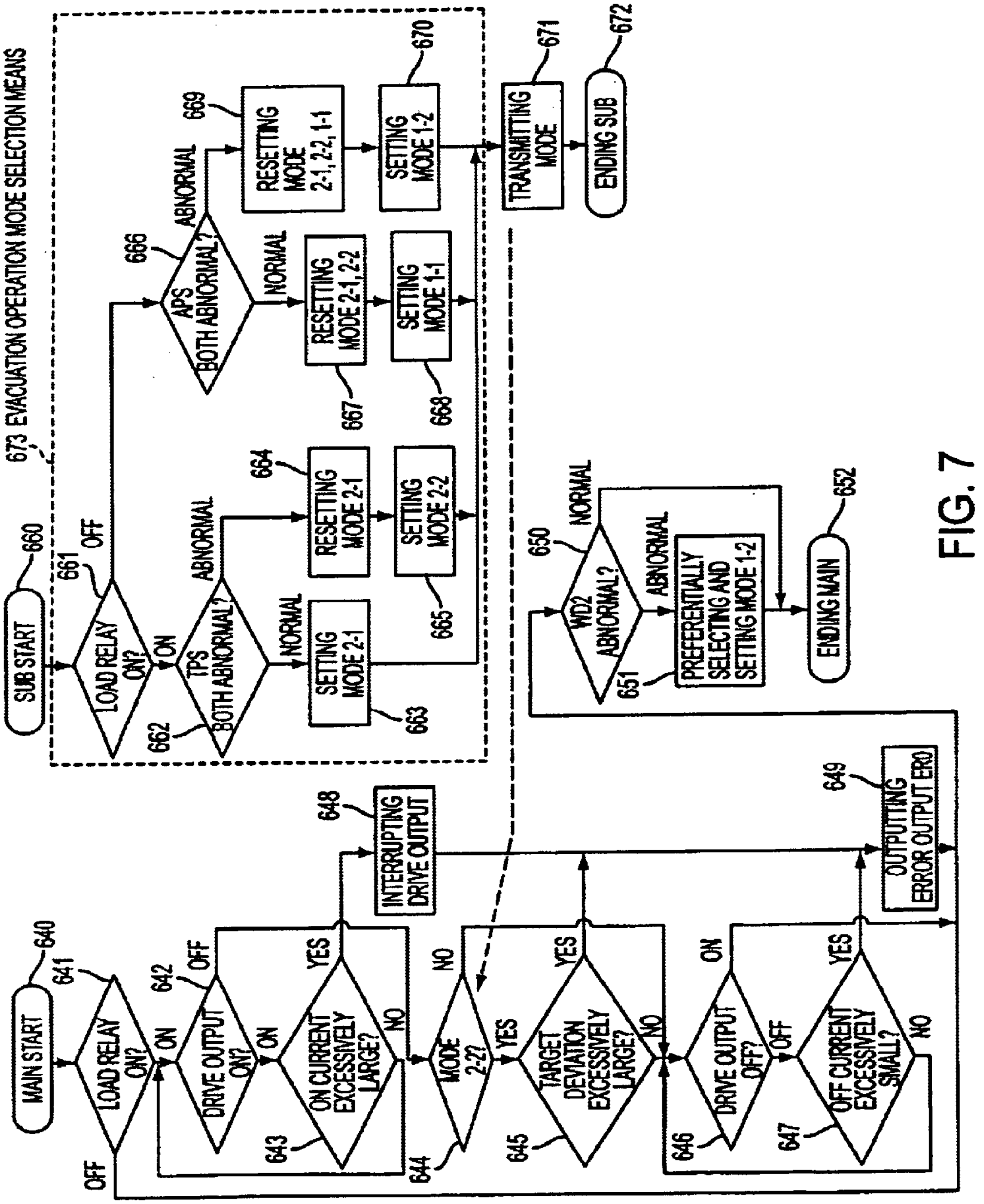
FIG. 7 is a flowchart to explain operation of the engine control system according to Embodiment 1 of the invention.

Next, referring to FIG. 7 showing an operation flowchart of a generation method of the error output ERO in the main CPU111 and the evacuation operation mode selection means, operation of the main CPU111 and the sub CPU121 is hereinafter described.

In FIG. 7, numeral 640 is an operation start step of the main CPU111 that is activated periodically in synchronization with an ON/OFF duty control of the motor 103. Numeral 641 is a step that acts subsequently to the step and determines whether or not the load relay 104*a* operates, based on the interrupt input IT1 of the main CPU111. Numeral 642 is a step that determines whether or not the control output DR is ON. While this is ON, the step 642 continues to determine whether or not the motor current is excessively large in the step 643. Then in the case of any excessive current being detected, this step 642 causes the control output DR to be OFF in the step 648, and the error output ERO is generated in the step 649 following this step. Numeral 644 is a step that acts when the control output DR is OFF in the step 642, and determines whether or not the evacuation operation mode described later is 2—2. Numeral 645 is a step that acts when the step 644 determines that the evacuation operation mode is 2—2, and determines whether or not a target deviation is excessively large. Contents thereof will be described in detail with reference to FIG. 11.

In addition, when the step 644 determines that the evacuation mode is not 2—2, the operation proceeds to the step 646. In the case that the step 645 determines that the target deviation is excessively large, the error output ERO will be generated in the step 649.

The step 646 is a step that determines whether or not the control output DR is OFF. While this is OFF, the step 646 continues to determine whether or not the OFF current of the motor circuit is excessively small in the step 647. Then in the case of the OFF current being excessively small, this step causes the error output ERO to be generated in the step 649.

Numeral 650 is a step that acts when the load relay 104*a* is OFF or when the control output DR is ON in the step 646, or subsequently to the step 649, and in which the main CPU111 monitors and determines any watchdog abnormality of the sub CPU121. Numeral 651 is a step that acts when there is any watchdog abnormality of the sub CPU121 and preferentially selects the evacuation operation mode 1-2. Numeral 652 is an operation end step when the step 650 determines that the state is normal, or subsequent to the step 651. This step 652 is arranged to proceed to the start step 640.

In addition, the step 643 is to be short circuit abnormality detecting means of the motor 103. The step 647 is to be disconnection abnormality detecting means of the motor 103. Numeral 645 is to be abnormality detecting means of the throttle valve opening control mechanism.

Furthermore, selection of the evacuation operation mode is carried out on the side of the sub CPU121. Whereas supposing that there is any watchdog abnormality in the sub CPU121, any selection result thereof is not reliable, and the evacuation operation mode 1-2 is forcibly selected in the step 651.

Numeral 660 is an operation start step of the sub CPU121 that is regularly activated by the interrupt operation. Numeral 661 is a step that acts following this operation start step and determines the ON/OFF of the load relay 104*a* based on the interrupt input IT1 of the sub CPU121. Numeral 662 is a step that acts when the load relay 104*a* is ON in the step 661, and determines whether or not the both abnormality storage 615*b* shown in FIG. 6 stores the both abnormalities of the TPS. Numeral 663 is a step that acts when the step 662 does not determine any both abnormalities and selects the evacuation operation mode 2-1. Numeral 664 is a step that acts when the step 662 determines the both abnormalities, resets the evacuation operation mode 2-1 stored in the step 663, and selects and stores the evacuation operation mode 2—2 in the step 665 following this step.

Numeral 666 is a step that acts when the load relay 104*a* is OFF in the step 661 and determines whether or not the both abnormality storage step 615*a* in FIG. 5 stores the both abnormalities. Numeral 667 is a step that acts when this step 666 does not determine any both abnormalities, resets the modes 2-1, 2—2 stored in the steps 663 or 665, and selects the evacuation operation mode 1—1 in the following step 668. Numeral 669 is a step that acts when the step 666 determines the both abnormalities, resets various evacuation operation modes 2-1, 2—2, 1—1 that are stored in the steps 663, 665, 668, and selects and stores the evacuation operation mode 1-2 in the following step 670. Numeral 671 is a step that acts subsequently to the steps 663, 665, 668, 670 and transmits to the main CPU111 the selected and stored evacuation operation mode. Numeral 672 is an operation end step following this step 671, and is this end step, waiting is required until the operation start step 660 is activated.

In addition, the selection storage information regarding each evacuation operation mode is reset when the power supply switch 107 is interrupted or turned on again.

Furthermore, when the error outputs ER11, ER12, ER13 in FIGS. 5 or 6, the error output ERO in FIG. 7 and the reset outputs RST1 or RST2 in FIG. 1 are generated, the first abnormality storage element 133 will operate and then the load relay 104*a* is interrupted. Accordingly the ON/OFF determination of the load relay 104*a* in the step 641 or in the step 661 is described as a representative of these operation conditions.

In addition, when classifying various evacuation operation modes, numbers of block diagrams showing the drive control means of the motor or the fuel cut control means corresponding to these modes are summarized as follows.

Figure 10:
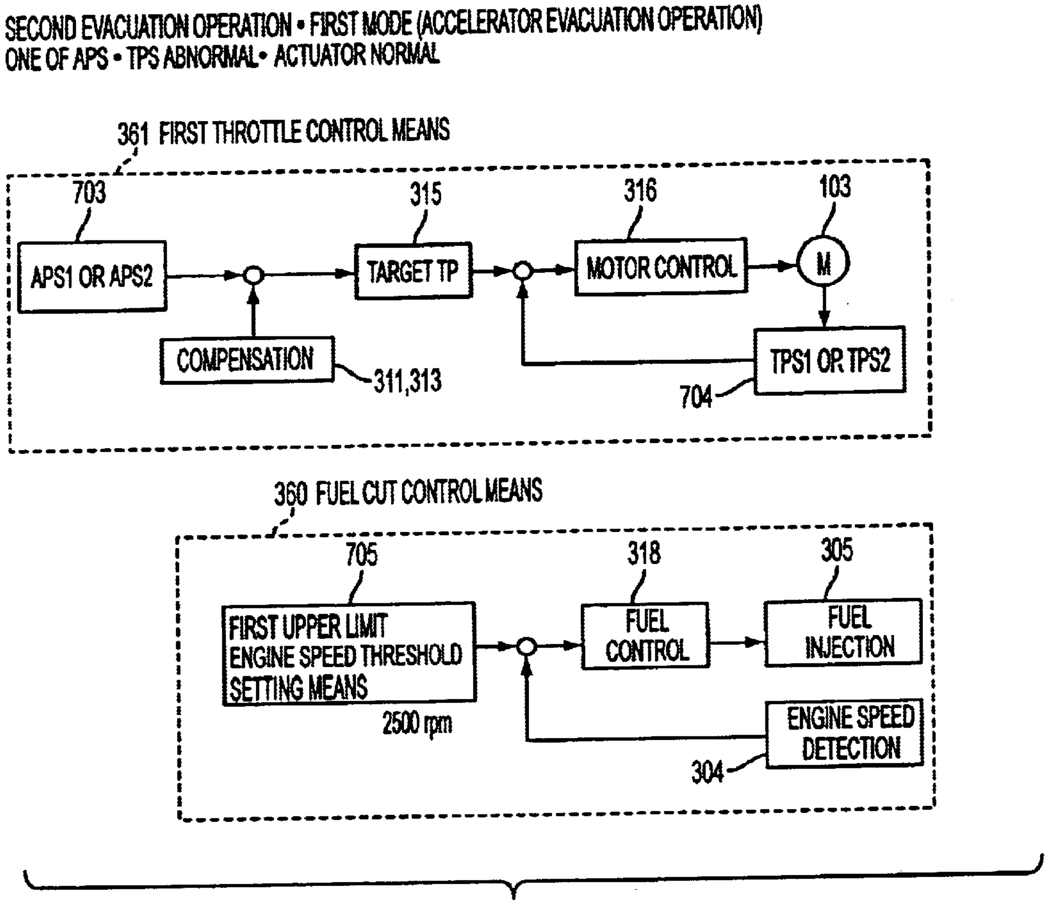
FIG. 10 is a block diagram (showing a second evacuation operation) of the engine control system according to Embodiment 1 of the invention.

1. Mode 2-1 (FIG. 10)

The first mode of the second evacuation operation means, when the actuator is normal and there are non-defective APS and TPS (the slightest abnormality)

Figure 11:
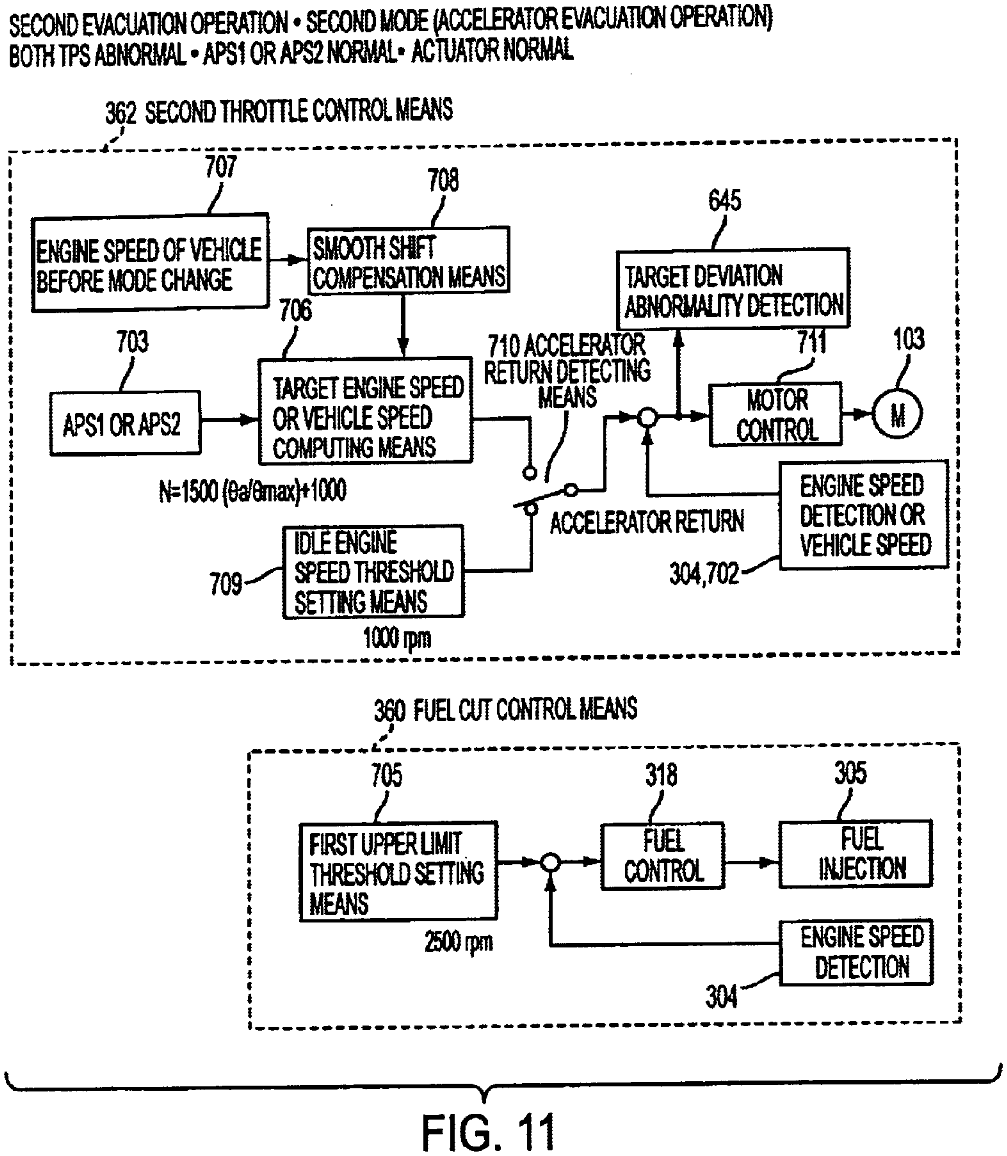
FIG. 11 is a block diagram (showing a second evacuation operation) of the engine control system according to Embodiment 1 of the invention.

2. Mode 2—2 (FIG. 11)

The second mode of the second evacuation operation means, when the APS1 or APS2 is normal, the actuator is normal, and both APS and TPS is abnormal (serious level in the slight abnormality)

Figure 12:
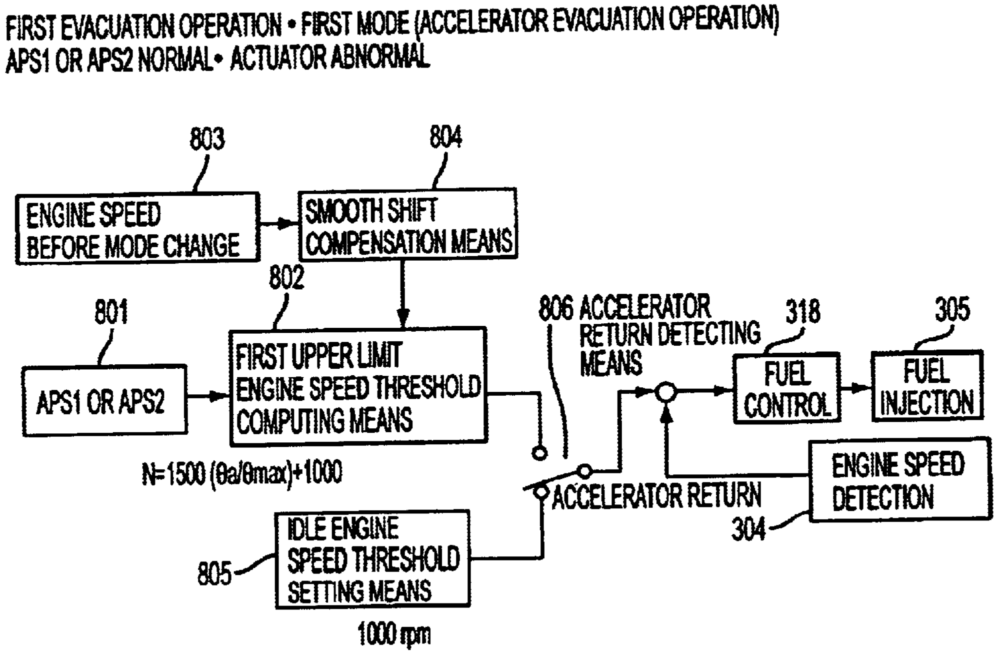
FIG. 12 is a block diagram (showing a first evacuation operation) of the engine control system according to Embodiment 1 of the invention.

3. Mode 1—1 (FIG. 12)

The first mode of the first evacuation operation means, when the actuator is stopped, and there is non-defective APS (slight level in the serious abnormality)

Figure 13:
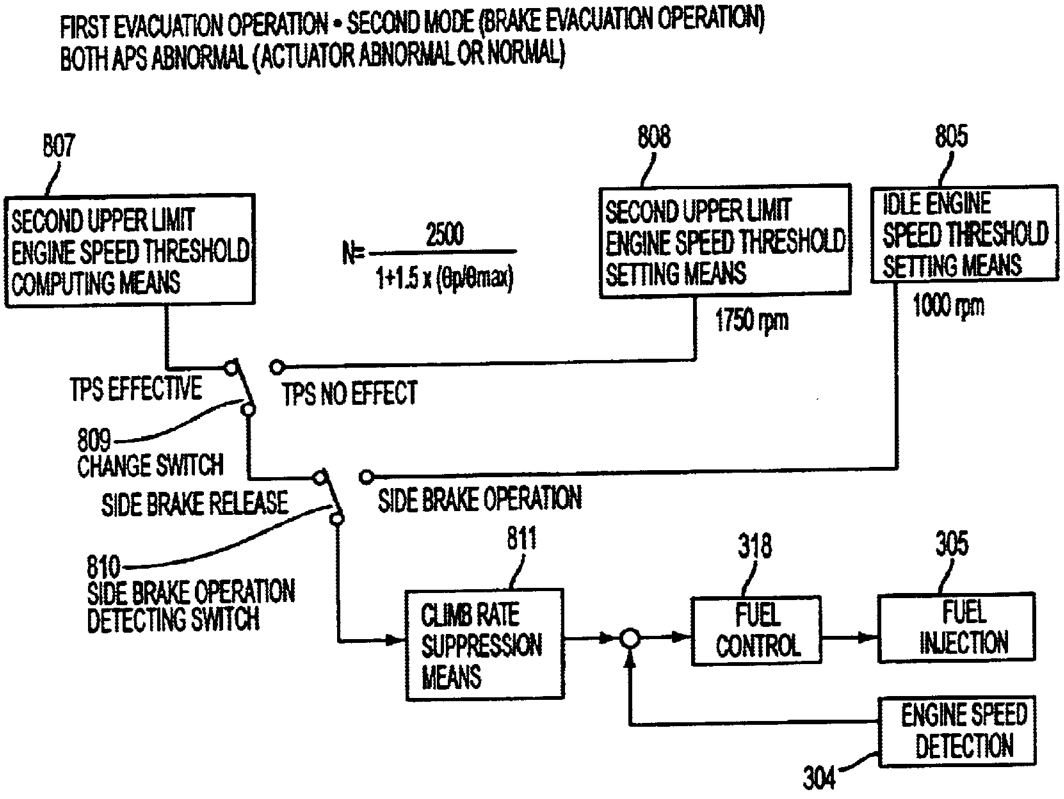
FIG. 13 is a block diagram (showing a first evacuation operation) of the engine control system according to Embodiment 1 of the invention.

4. Mode 1-2 (FIG. 13)

The second mode of the first evacuation operation means, when the actuator is stopped, and the APS are both abnormal (the most-serious abnormality)

Each of the operations referring to FIGS. 1 to 3 has been described so far together with the description of the arrangement. Now, various abnormality determinations and the processing to cope with the results thereof are synthetically described mainly referring to FIGS. 1, 5 and 6.

In FIG. 1, four types of abnormality detection inputs are connected to the set input section 133*a* of the first abnormality storage element 133 that stores generation of the serious abnormality.

First, as to the abnormality of the main CPU111 or the sub CPU121 itself, the first and second reset outputs RST1 and RST2 are stored. On the other hand, as to the operation abnormality of the CPU relating to the throttle control, the abnormality is also stored by means of the error outputs ER12 (FIG. 5), ER13 (FIG. 6) of the sub CPU121 based on the first and second half control abnormality detecting means 624*a*, 624*b*.

Furthermore, when there are both abnormalities in the accelerator position sensor, the error output ER11 (FIG. 5) is stored. As for the abnormality of the motor 103, as shown in FIG. 7, the error output ERO is stored based on the determination of the main CPU111.

A mechanical abnormality of the throttle valve open/close mechanism is detected by the second half control abnormality detecting means 624*b* (FIG. 6), and then the error output ER13 is stored. Otherwise the mechanical abnormality is detected by the target deviation abnormality detecting means 645 (FIG. 7), and then the error output ERO is stored.

When the first abnormality storage element 133 operates upon occurrence of any of such various abnormalities, the first alarm and display 109*a* operates and informs a driver of the abnormality. Further, the load relay 104*a* is de-energized, the power supply circuit of the motor 103 is interrupted, and the throttle valve 200*b* is returned to the default position by the default mechanism 208 (FIG. 2).

The second abnormality storage element 136 that stores occurrence of the slight abnormality, stores the operation of the error output ER21 due to abnormality in one of the APS (FIG. 5), the error output ER22 due to abnormality in one of the TPS (FIG. 6) and the error output ER23 due to abnormality in both TPS, thereby operating the second alarm and display 109*b*.

In addition, in the case of the CPU being out of control due to any temporary noise malfunction and the like, the CPU itself is automatically reset and started again thus restoring the normal operation. Even in this case, the first abnormality storage element 133 stores the abnormal operation, the alarm and display 109*a* operate, or the default restoration of the throttle valve 200*b* (FIG. 2) is carried out.

However, once the power supply switch 107 is interrupted and then turned on again, the first abnormality storage element 133 will be reset by means of the pulse output IGSP. Therefore it becomes possible to restore the normal state of operation including the throttle control.

In the case that the abnormality generation is not the temporary one caused by noise malfunction and the like, such abnormality will be detected again and stored, despite that the first abnormality storage element 133 is once reset by means of the power supply switch 107.

The reset operation by means of the power supply switch 107 is also carried out with respect to the second abnormality storage element 136. In the case of not being restored from the abnormal state, such abnormal state is detected again and stored.

Figure 8:
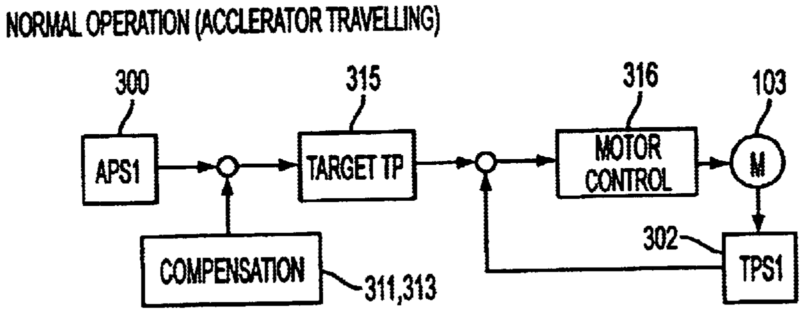
FIG. 8 is a block diagram (showing a normal operation) of the engine control system according to Embodiment 1 of the invention.
Figure 9:
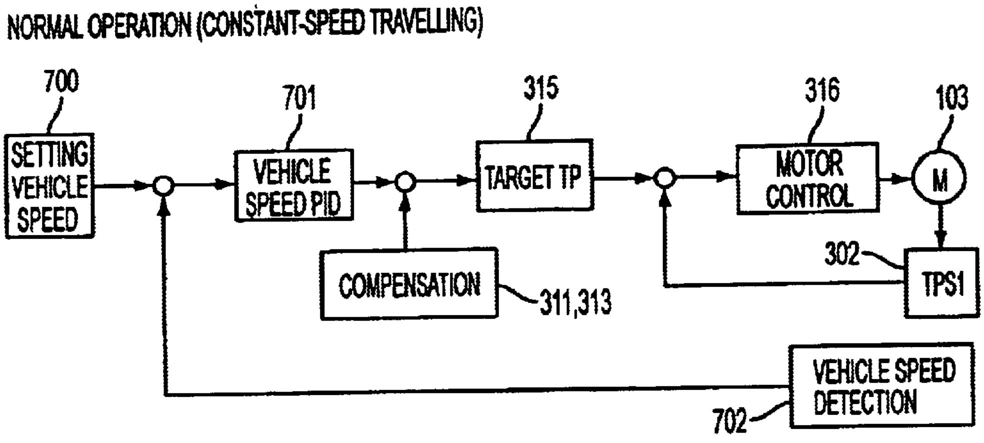
FIG. 9 is a block diagram (showing a normal operation) of the engine control system according to Embodiment 1 of the invention.

FIGS. 8 and 9 are block diagrams each showing an automatic control concerning various operation modes in the case that the actuator system is normal. These automatic controls are implemented on the side of the main CPU111 while obtaining partial information from the sub CPU121.

FIG. 8 is a block diagram showing an automatic control concerning a travelling by means of the accelerator pedal during the normal operation. By algebraically adding the compensation signal obtained by the idle compensation 311 and the operation compensation 313, shown in FIG. 3, to the signal output detected by the accelerator position sensor 300 that detects the degree of depression of the accelerator pedal, the first target throttle valve opening 315 is computed. Further, while conducting a feeding back of the valve opening signal that is detected by means of the throttle position sensor 302 for detecting the throttle valve opening, the throttle valve opening controlling motor 103 is controlled by the PID control section 316.

FIG. 9 is a block diagram showing an automatic control concerning a constant-speed travelling during the normal operation. An automatic control of dual feedback loop for computing the first target throttle valve opening 315 is carried out in by the PID control section 701 while conducting a feedback of the actual vehicle speed signal that is detected by the vehicle speed detecting means 702 with respect to the target vehicle speed set by the target vehicle speed setting means 700.

In addition, the target vehicle speed setting means 700 is arranged so as to store a current vehicle speed before entering in the constant speed travelling mode by means of a vehicle speed storage instruction switch, etc. under the sate that a constant speed travelling mode switch not shown is selected. Accordingly, when depressing the brake pedal, the constant speed travelling operation is once released. However, when accelerating again to reach the stored target vehicle speed, the stored target vehicle speed comes to be effective again. Furthermore when depressing the accelerator pedal during the constant speed travelling operation, the operation at the vehicle speed of not lower than the target vehicle speed comes to be possible.

FIG. 10 shows an automatic control block concerning the first mode (the slightest abnormality) in the second evacuation operation means. This mode is the evacuation operation mode available in the case that one of the APS1 and APS2 is abnormal or/and one of the TPS1 and TPS2 is abnormal, and the others remain normal.

The automatic control block arrangement of the motor in FIG. 10 is the same as in the case of FIG. 8. The compensation signal obtained by the idle compensation 311 or the operation compensation 313, shown in FIG. 3, is algebraically added to the signal output 703 detected by the APS1 or APS2, which is regarded as being normal, among the accelerator position sensors for detecting the degree of depression of the accelerator pedal, whereby the first target throttle valve opening 315 is computed. Further, the throttle valve opening controlling motor 103 is controlled by the PID control section 316 while conducting a feedback of the valve opening signal 704 detected by the TPS1 or TPS2, which is regarded as being normal among the throttle position sensors for detecting the throttle valve opening.

However, the fuel cut control is carried out by driving the fuel injection valve 305 by the engine speed suppression means 318 while conducting a feedback of the signal detected by the engine speed detecting sensor 304 so as to prevent the engine speed from exceeding, for example, 2500 rpm by the first upper limit engine speed threshold setting means 705.

In addition, the first target throttle valve opening 315 is not specially suppressed and, therefore, in the above-discussed example, under the condition that the engine speed is not higher than 2500 rpm, a hill-climbing travelling in so-called full throttle can be done.

It is desired that the above-described first upper limit engine speed threshold value 705 is an engine speed of such a degree that approximately 70% output torque of the maximum torque of the engine can be secured in the state of full throttle.

In addition, numeral 360 designates fuel cut control means, and numeral 361 designates first throttle control means.

FIG. 11 is a block diagram showing an automatic control concerning the second mode (serious level in the slight abnormality) in the second evacuation operation means. This mode is an evacuation operation mode available in the case that at least one of the APS1 and APS2 is normal, but both TPS1 and TPS2 are abnormal, and the others remain normal.

In FIG. 11, numeral 703 designates a signal output detected by the APS1 or APS2 that is regarded as being normal. Numeral 706 designates target engine speed or vehicle speed operation means which value is calculated as a value substantially proportional to the detected output. For example, a target engine speed N is calculated by the following expression:

$$N=1500(\theta a/\theta\max)+1000\ [\text{rpm}] \tag{1}$$

where: θa=current depression degree of the accelerator pedal=0 to θmax; and θmax=maximum depression degree of the accelerator pedal.

Numeral 707 designates storage means for temporarily storing the engine speed or vehicle speed before change of the operation mode. Numeral 708 designates smooth shift compensation means for transitionally compensating the computation by the above-described target engine speed or vehicle speed operation means 706. This compensation means causes the target engine speed or vehicle speed to shift gradually from an initial value thereof that is temporarily stored by the above-discussed storage means 707 to a target engine speed or vehicle speed based on the foregoing expression (1).

In addition, it is preferable that the above-described smooth shift compensation means 708 causes the engine speed or vehicle speed to smoothly shift only when the value calculated by the above-described expression (1) is larger than that temporarily stored by the target engine speed or vehicle speed storage means 707. In this case, it is preferable that a driver conducts the operation of returning the accelerator pedal to a position appearing to be appropriate when the driver wants to maintain the identical engine speed or vehicle speed.

Numeral 709 designates idle engine speed threshold setting means for setting, for example, to a degree of 1000 rpm. The target idle engine speed, which is set herein, is to be an engine speed as low as possible to such a degree as being capable of maintaining the engine speed even in the case that any load of the air conditioner and the like is imposed or that the engine coolant temperature is low.

Numeral 710 designates accelerator return detection means for conducting a switching operation depending on whether or not the accelerator pedal is returned. Numeral 711 designates a PID control section for the motor 103. This PID control section automatically controls the motor 103 during the accelerator pedal being depressed so that the engine speed or vehicle speed computed by the target engine speed or vehicle speed computing means 706 may coincident to the feedback signal detected by the engine speed detecting sensor 304 or the vehicle speed detecting means 702.

Furthermore, the above-described PID control section 711 controls the motor 103 during the accelerator pedal not being depressed so that the setting engine speed set by the idle engine speed threshold setting means 709 and the feedback engine speed detected by the engine speed detecting sensor 304 may be coincident.

Numeral 645 designates the target deviation abnormality detecting means described in FIG. 7. This detecting means is arranged such that the error output ERO is generated, and then the power supply circuit for the motor 103 is interrupted when an excessively large deviation is generated between the target and actual values due to the abnormality in the actuator system, etc.

Numeral 705 designates the first upper limit engine speed threshold setting means as described in FIG. 10. By this setting means, to prevent the engine speed from exceeding, for example, 2500 rpm, the fuel injection valve 305 is driven by the engine speed suppression means 318 to carry out the fuel cut control while conducting a feedback of the signal detected by the engine speed detecting sensor 304.

In addition, numeral 360 designates fuel cut control means, and numeral 362 designates second throttle control means.

FIGS. 12 and 13 are block diagrams each showing an automatic control concerning the first evacuation operation means (serious abnormality) in the case of the actuator system being abnormal. The automatic control is carried out on the side of the main CPU while partial information is obtained from the sub CPU121.

FIG. 12 shows the automatic control block concerning the first mode in the first evacuation operation means (slight level in the serious abnormality). This mode is an evacuation operation mode available in the case that at least one of the APS1 and APS2 is regarded as being normal.

In FIG. 12, numeral 801 designates a signal output detected by the APS1 or APS2 and regarded as being normal. Numeral 802 designates first upper limit engine speed threshold computing means in which threshold value is calculated as a value substantially proportional to the detected output. For example, the threshold engine speed N is calculated by the same expression as in the foregoing expression (1).

Numeral 803 designates storage means for temporarily storing the engine speed before changing the operation mode. Numeral 804 designates smooth shift compensation means for transitionally compensating the computation conducted by the above-described first upper limit engine speed threshold computing means 802. This compensation means causes the engine speed to shift gradually from the engine speed temporarily stored in the above-described storage means 803 as an initial value to the threshold engine speed based on the expression (1).

Furthermore, it is also preferable that the above-described smooth shift compensation means 804 causes the engine speed to smoothly shift only in the case that the threshold engine speed based on the above-described expression (1) is larger than the engine speed that is temporarily stored in the storage means 803.

In this case, it is preferable that the driver returns the accelerator pedal to the position that appears to be appropriate when he wants to maintain the identical engine speed or vehicle speed.

Numeral 805 designates idle engine speed threshold setting means for setting, for example, to a degree of 1000 rpm. The target idle engine speed, which is set herein, is to be an engine speed as low as possible to such a degree as being capable of maintaining the engine speed even in the case that any load of the air conditioner and the like is imposed or that the engine coolant temperature is low.

Numeral 806 designates accelerator return detecting means for carrying out the switching operation depending on whether or not the accelerator pedal is returned. Numeral 318 designates engine speed suppression means. This suppression means 318, during the accelerator pedal being depressed, drives the fuel injection valve 305 so that the engine speed computed by the first upper limit engine speed threshold computing means 802 may be coincident to the feedback engine speed detected by means of the engine speed detecting sensor 304, thereby conducting the fuel cut control.

Further, during the accelerator pedal not being depressed, the engine speed suppression means 318 drives the fuel injection valve 305 so as to prevent the engine speed set by the idle engine speed threshold setting means 805 from exceeding a feedback engine speed detected by means of the engine speed detecting sensor for the engine 304, thus carrying out the fuel cut control.

FIG. 13 shows an automatic control block concerning the second mode in the first evacuation operation means (the most-serious level in the serious abnormality). This mode is to be an evacuation operation mode available in the case that at least one of the TPS1 and TPS2 is normal, but both APS1 and APS2 are abnormal.

In FIG. 13, numeral 807 designates second upper limit engine speed threshold computing means for computing a threshold engine speed N that is shown, for example, by the following expression on the basis of the signal output θp detected by the TPS1 or TPS2 that is regarded as being normal.

$$N=2500/[1+1.5\times(\theta p/\theta\max)]\ [\mathrm{rpm}] \qquad (2)$$

where: θp=current throttle valve opening=0 to θmax; and θmax=full throttle valve opening In addition, the current throttle valve opening θp is originally corresponding to the default return position by the default mechanism 208, this is, however, the expression is based on the assumption that the present throttle valve opening θ might be locked at an indefinite valve opening position due to mechanical abnormality.

Figure 14:
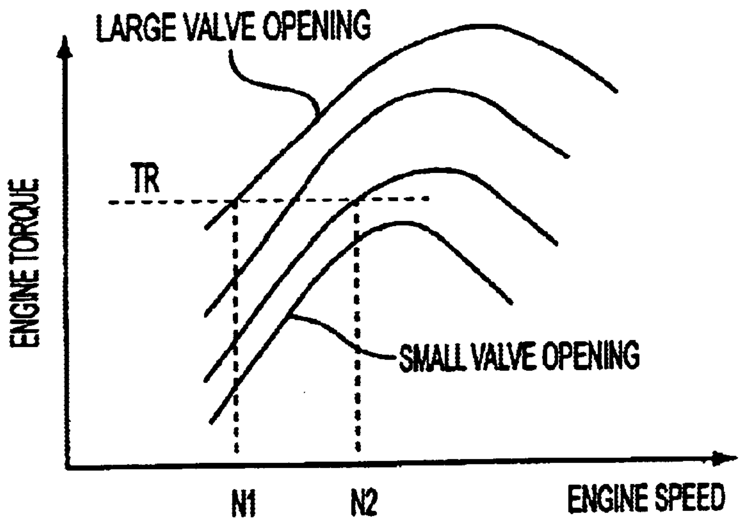
FIG. 14 is a graphic diagram showing control characteristic (engine characteristic) of the engine control system according to Embodiment 1 of the invention.

Further, the computation of the engine speed by the above-described second upper limit engine speed threshold computing means 807 is based on an engine torque characteristic in FIG. 14. The engine output torque shown in the axis of ordinates is illustrated in the form of substantially quadratic curve of mound shape with respect to the engine speed shown with the axis of abscissas. Further, the greater the maximum engine torque value is, the larger the throttle valve opening is.

Particularly in the region of the engine speed being low, the engine output torque is substantially in proportion to the engine speed.

Accordingly, supposing that the engine speed is regulated to a low engine speed N when the throttle valve opening is large, while being regulated to a large engine speed N2 when the throttle valve opening is small, output torque of the engine is regulated to a level of a transverse line TR in FIG. 14.

The foregoing expression (2) is the upper limit engine speed in order to obtain approximately a regular output torque TR. This output torque is selected to a level in which the vehicle can be easily stopped by depression of the brake pedal and light-load operation of the vehicle becomes possible when releasing the brake pedal.

Numeral 805 designates idle engine speed threshold setting means for setting, for example, to a 1000 rpm degree. The target idle engine speed set herein is to be an engine speed that is as low as possible to such a degree as being capable of maintaining the engine speed even in the case that any load of the air conditioner and the like is imposed, or that the engine coolant temperature is low.

Numeral 808 designates second engine speed threshold setting means for setting, for example, to a 1750 rpm degree. The threshold set herein is used as the threshold value of the engine speed when both throttle position sensors TPS1 and TPS2 are abnormal, and the operation by the above-described second upper limit engine speed threshold setting means 807 cannot be carried out.

Numeral 809 designates a change switch that selects the above-described second upper limit engine speed threshold setting means 808 or the second upper limit engine speed threshold computing means 807 depending on whether or not both TPS1 and TPS2 are abnormal.

Numeral 810 designates a detection switch that switches depending on whether or not a side brake is operated. The side brake herein has an auxiliary braking function for stopping and holding the vehicle which function is added to a main braking function by the actuation of the brake pedal.

Numeral 811 designates climb rate suppression means for restraining the threshold value of the engine speed from increasing sharply when the above-described change switch 809 or 810 is switched. This suppression means 811 also serves as engine speed sudden going up suppression means in the case of shifting from the other operation mode to this operation mode.

The engine speed suppression means 318 drives the fuel injection valve 305 so that the engine speed detected by the engine speed detecting sensor 304 may be not higher than the above-described various threshold engine speeds to carry out the fuel cut control. This control will be carried out in the following manner. When the side brake is operated, a lowermost threshold value set by the idle engine speed threshold setting means 805 is used. When releasing the side brake, in the case of both TPS1 and TPS2 being abnormal, an intermediate threshold vale computed by the second upper limit engine speed threshold computing means 808 is used. On the other hand, in the case of at least one of the TPS1 of TPS2 being effective, a threshold vale computed by the second upper limit engine speed threshold computing means 807 is used.

Accordingly, when the side brake is operated, judging that there is a will of stopping the vehicle, the engine speed is regulated to the lowermost threshold value. On the contrary, when the side brake is released, judging that there is a will of moving the vehicle, the engine speed goes up.

However, the engine output torque at this time is regulated to a level of not easily stopping the vehicle by the depression of the brake pedal. Therefore, even if the throttle valve opening is in the state of full open, the evacuation operation can be carried out safely.

Furthermore, in the case that the throttle valve opening is abnormally locked below a predetermined default position, it is desired that the engine output torque necessary for the evacuation operation is increased. For that purpose, it is ideal to add any control such as increase in fuel/air ratio or advanced ignition time.

In addition, in the evacuation operation means shown in FIGS. 10, 11 and 12, the two-pedal evacuation operation is carried out in such a manner that the vehicle is accelerated by means of the accelerator pedal, and the vehicle is decelerated by means of the brake pedal. On the other hand, in the evacuation operation means shown in FIG. 13, the one-pedal evacuation operation is carried out only by actuating the brake pedal in different strengths, and this operation means is used as a final backup means.

Consequently, it is desired that the operation according to this evacuation operation mode is possible only by the main CPU111 even if the sub CPU121 is abnormal. Details thereof will be described later referring to FIG. 15. Embodiment 2.

Figure 15:
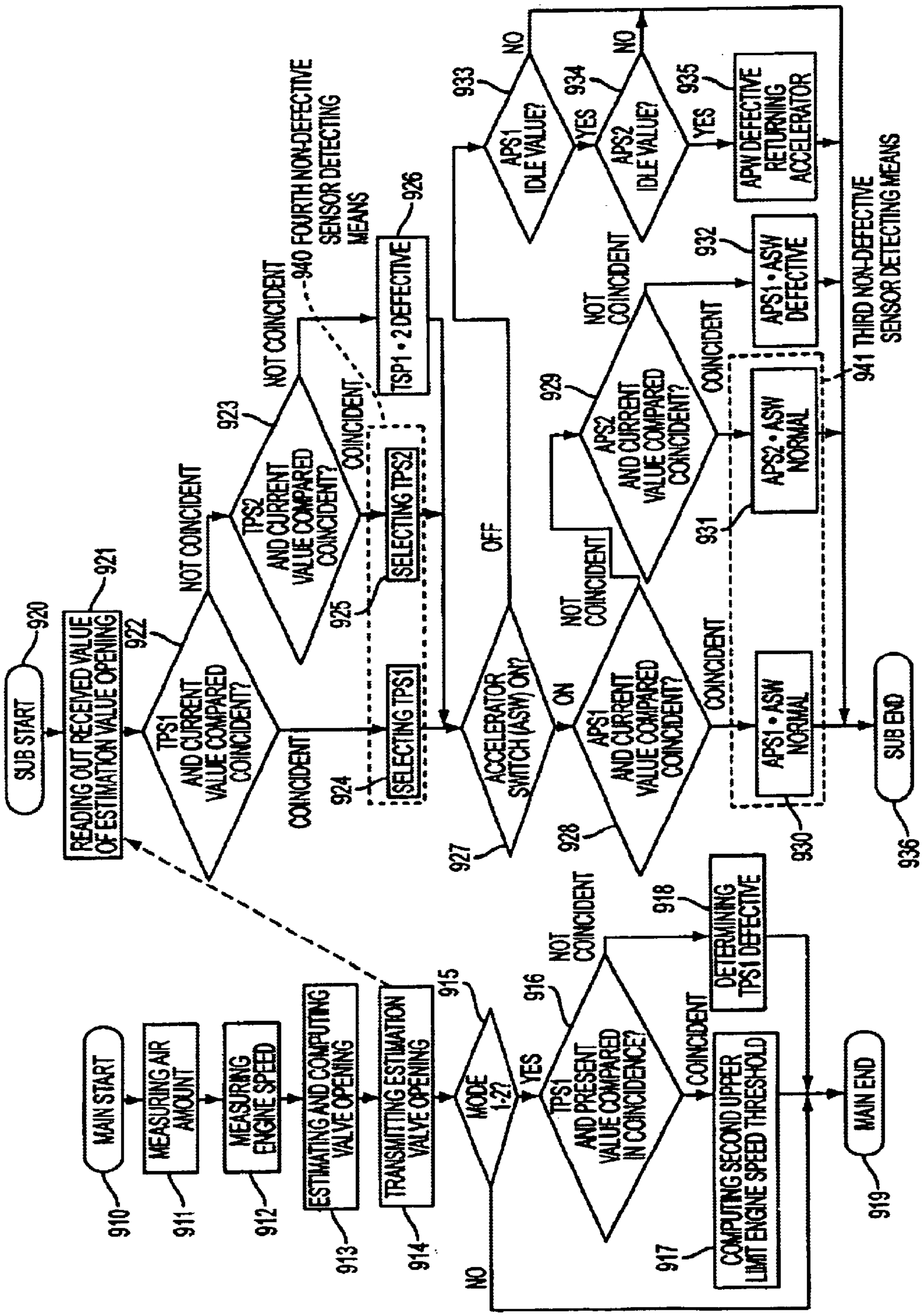
FIG. 15 is a flowchart to explain operation of the engine control system according to Embodiment 2 of the invention.
Figure 17A:
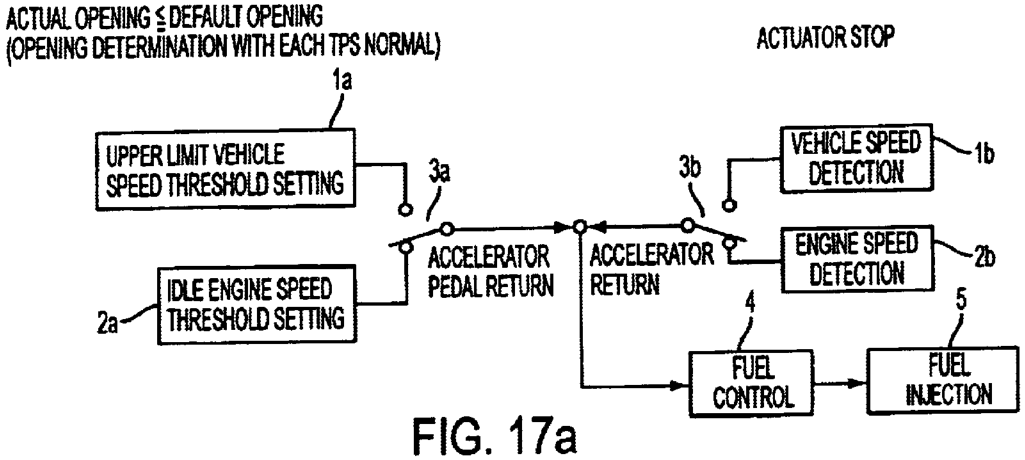
FIG. 17a (PRIOR ART)
FIG. 17 is a block diagram (showing an evacuation operation) of a conventional engine control system.
Figure 17B:
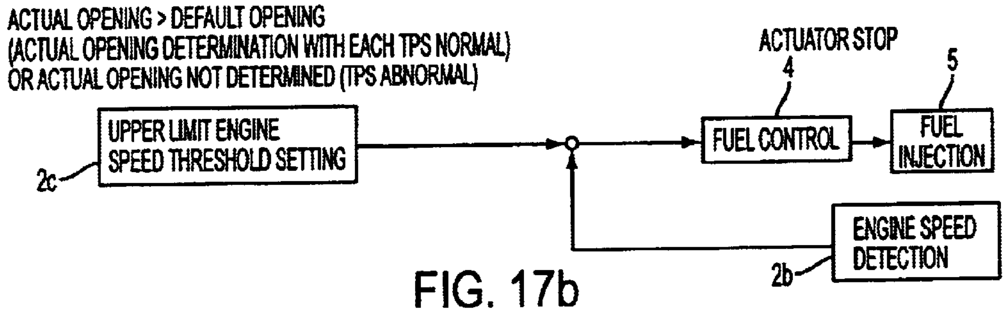
FIG. 17b (PRIOR ART)
Figure 17C:
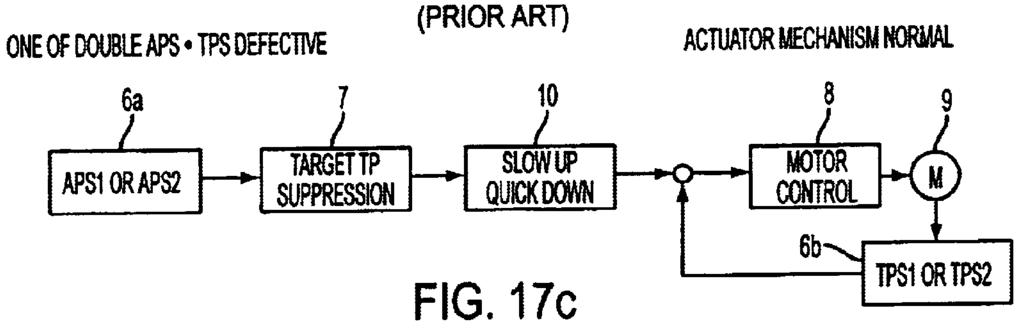
FIG. 17c (PRIOR ART)
Figure 17D:
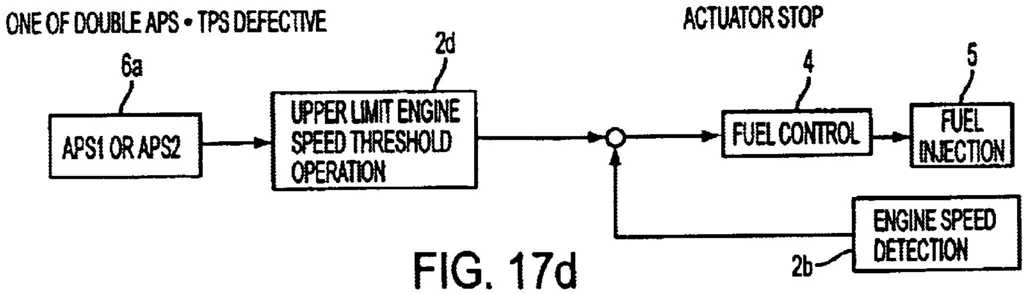
FIG. 17d (PRIOR ART)

FIG. 15 is a flowchart to explain an operation at third and fourth non-defective selection means according to Embodiment 2 of the invention. This operation is carried out in the case that the operation mode 1-2 is controlled only by the main CPU111, or the APS and TPS are relatively abnormal although the APS or TPS is not individually abnormal, and it cannot be identified which one is abnormal.

Figure 16:
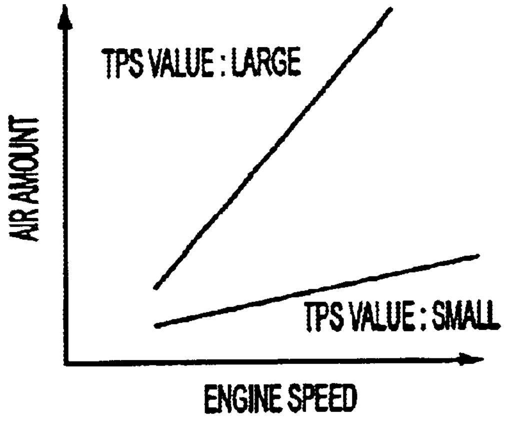
FIG. 16 is a graphic diagram showing control characteristic (engine characteristic) of the engine control system according to Embodiment 2 of the invention.

In FIG. 15, numeral 910 is an operation start step of the main CPU that is regularly activated by the interrupt operation. Numeral 911 is a step that acts subsequently to the start step 910 and measures an inflow air amount using the signal of an air flow sensor mounted on an intake tube not shown. Numeral 912 is a step that acts subsequently to the measurement step 911 and measures the engine speed using the signal of the engine speed detecting sensor 304. Numeral 913 is a step that acts subsequently to this measurement step 911 and estimates and operates a current throttle valve opening based on the air amount versus the engine speed characteristic using the throttle valve opening shown in FIG. 16 as parameter. The characteristic shown in FIG. 16 is to be preliminarily stored as an actually measured table on the basis of an approximate operation expression or an learned value.

Numeral 914 is a step that transmits to the sub CPU121 the throttle valve opening estimated and operated in the above-described step 913. Numeral 915 id a step that acts subsequently to this transmission step and determines whether or not the operation mode transmitted from the sub CPU121 to the main CPU111 in the step 671 of FIG. 7 is the 1-2. Numeral 916 is a step that acts when this determination step 915 determines YES, and compares the throttle valve opening estimated in the step 913 with the valve opening output detected by the TPS1 being an input signal of the main CPU111.

Numeral 917 is computation step of the threshold vale which step is equivalent to the second upper limit engine speed threshold computing means 807 in FIG. 13 on condition that they are determined coincident in the comparison step. Numeral 918 is a step that acts when determined not coincident in the above-described comparison step 916, stores that the TPS1 is abnormal, and switches the change over switch 809 in FIG. 13 to the side of no effect. Numeral 919 is an operation end step when the above-described determination step 915 determines NO, or subsequent to the steps 917 and 918. In this end step 919, waiting is required until the operation start step 910 is activated.

In addition, in the step 651 of FIG. 7, the determination step 915 preferentially determines the operation mode 1-2 that is selected in the main CPU at the time of watchdog abnormality in the sub CPU121. The step 915 is arranged such that when the sub CPU121 is abnormal, the control operation of the second operation mode (1-2 mode) in the first evacuation operation means shown in FIG. 13 can be implemented solely by the main CPU111.

Numeral 920 is an operation start step of the sub CPU121 that is regularly activated by interrupt operation. Numeral 921 is a step that acts subsequently to this start step 920 and reads out the received data of the estimation valve opening transmitted from the main CPU111 in the above-described step 914. Numeral 922 is a step that acts subsequently to the step 920 and compares the estimation throttle valve opening read out in the step 921 with the valve opening output detected by the TPS1 separately transmitted from the main CPU111.

Numeral 923 is a step that acts when they are determined not coincident in the comparison step, and compares the estimated throttle valve opening read out in the step 921 with the valve opening output detected by the TPS2 being the input signal of the sub CPU121. Numeral 924 is a step that acts when they are determined coincident in the above-described comparison step 922, and selects and stores the TPS1 as non-defective. Numeral 925 is a step that acts when they are determined coincident in the above-described step 923, and selects and stores the TPS2 as non-defective. Numeral 926 is a step that acts when they are determined not coincident in the above-described step 923, and stores that both TPS1 and TPS2 are abnormal. Based on the results of these selection and storage, selection of the non-defective sensor of possibly reliable is carried out by adding a third information being an estimated valve opening when the steps 612*b* and 613*b* determine not individually abnormal, despite that the step 610*b* in FIG. 6 determines relatively abnormal.

Numeral 927 is a step that acts subsequently to the above-described steps 924, 925, 926 and determines the ON/OFF of the accelerator switch 213 (see FIG. 2) that is ON upon returning of the accelerator pedal. Numeral 928 is a step that acts when the determination step 927 determines ON, and compares and determines whether or not the accelerator pedal depression degree output detected by the APS1 separately transmitted from the main CPU111 is coincident to a predetermined return position signal output. Numeral 929 is a step that acts when the above-described determination step 928 determines not coincident, and compares and determines whether or not the accelerator pedal depression degree output detected by the APS2 being an input signal of the sub CPU121 is coincident to a predetermined return position signal output. Numeral 930 is a step that acts when the above-described determination step 928 determines they are coincident, and stores that the APS1 and the accelerator switch 213 are normal. Numeral 931 is a step that acts when the above-described determination step 929 determines they are coincident, and stores that the APS2 and the accelerator switch 213 are normal. Numeral 932 is a step that acts when the above-described determination step 929 determines they are not coincident, and stores that any of the APS1, APS2, accelerator switch 213 is abnormal.

Numeral 933 is a step that acts when the above-described step 927 determines OFF, and compares and determines whether or not the present value of the APS1 is coincident to a predetermined value at the accelerator return position. Numeral 934 is a step that acts when the step 933 determines YES, and compares and determines whether or not the present value of the APS2 is coincident to a predetermined value at the accelerator return position. Numeral 935 is a step that acts when this step 933 determines YES, and stores that the accelerator switch 213 is abnormal although the APS1 and APS2 are normal. Numeral 936 is an operation end step that subsequently acts when the above-described steps 930, 931, 932, 935 and the step 933 determine NO, or the step 934 determines NO. In this end step 936, waiting is required until the operation start step 920 is activated.

Based on the results of these selection and storage, selection of the non-defective sensor of possibly reliable is carried out by adding a third information being an accelerator switch when the steps 612*a* and 613*a* determine not individually abnormal, despite that the step 610*a* in FIG. 5 determines relatively abnormal.

Addition of this non-defective selection can bring about the possibility of releasing both abnormalities, when both abnormalities of the APS occur and grow up to a serious abnormality, and the engine is started again without depressing the accelerator pedal after the power supply switch is once interrupted.

Further, even if the accelerator switch 213 is in failure, in the case that both APS1 and APS2 are detected being within a predetermined output corresponding to the accelerator pedal return position, the step 935 serves as the accelerator return detection means in FIGS. 11 or 12. And an output detected in this step will be an alternative signal of the accelerator switch 213.

Furthermore, numeral 940 is fourth non-defective sensor detecting means that includes the steps 924 and 925. Numeral 941 is third non-defective sensor detecting means that includes the steps 930 and 931.

The embodiment according to the invention described above is arranged such that the main CPU111 and sub CPU121 carry out the delivery of various signals via the serial interfaces 117 and 127.

Therefore, as to a communication abnormality between the serial interfaces 117 and 127, it is desired that following abnormality detecting means may be added. This abnormality detecting means is arranged such that the main CPU111 and the sub CPU121 mutually check a communication response time from the other CPU. If there is any time out error on the side of the sub CPU121, a reset output RST2 is generated on the side of the main CPU111, thereby starting the sub CPU121 again to cause the first abnormality storage element 133 to operate. Further in the case that there is any time out error on the side of the main CPU111, an error output ER1 is generated on the side of the sub CPU to cause the first abnormality storage element 133 to operate.

On the other hand, result of various abnormality determinations and result of operation mode selection in the sub CPU121 are stored by adding an external flip-flop element driven from the sub CPU121, and these stored results are connected to an interrupt control input of the main CPU111. As a result, there is an advantage that any change in the state can be instantaneously read at the main CPU111, or result of the past determination remains unchanged even if the sub CPU121 is abnormal.

Likewise, it is preferable that the input signal connected to the main CPU111 side such as APS1, TPS2, the first target throttle valve opening computed in the main CPU111 or the like is directly read from the sub CPU121 via any dual port RAM memory.

Further, it is also preferable that the ignition control and fuel injection control are conducted at the first CPU, the throttle valve drive control is conducted at the second CPU, and the monitoring control associated with the throttle valve control is conducted at the first CPU.

In this case, it is possible that the control input necessary for each CPU is directly connected to respective CPUs whereby the signal delivery by the serial interfaces is stopped, and that the required information is bus-delivered as input/output signal of the mutual CPU.

In the description described above, note that the motor drive control includes the whole automatic control block shown entirely in FIG. 8 or 9, or the whole automatic control block relating to the motor shown in FIG. 10 or FIG. 11.

Additionally, the overall fuel injection control means is not illustrated. Note that this fuel injection control means includes the whole system for injecting the fuel against each cylinder at an appropriate timing based on the signal of a crank angle sensor, and for controlling the injection amount of the fuel so as to be in an appropriate fuel/air ratio based on the signal of the air flow sensor, oxygen concentration sensor, etc.

The suppression control of the engine speed by fuel cut includes the whole automatic control block shown entirely in FIG. 12 or 13, or the whole automatic control block relating to the fuel injection valve shown in FIG. 10 or FIG. 11. However, this suppression control is added as a partial function of the above-described fuel injection control means. During the normal operation, the fuel cut is carried out so as to prevent the engine speed from exceeding, for example, a degree of 8000 rpm as the maximum engine speed.

Particularly, in the foregoing embodiment system according to the invention, the fuel cut control is carried out so that the engine speed may be lower by the idle engine speed threshold setting means, the upper limit engine speed threshold setting means, the upper limit engine speed threshold computing means, etc. In the fuel cut control, to secure a stable engine speed, it is devised that number of times of the fuel injection is thinned out, or alternately thinned out for a part of the multi-cylinder engine.

As described above, in the engine control system according to claim 1 of the invention, one of the multi-stage operation means in response to multi-stage degrees of abnormality, i.e., serious abnormality, slight abnormality and the normality, can be selected and operated. Furthermore, in the case that the abnormality degree is changed, the shift of the operation means toward the side of getting worse the abnormality degree is possible, while the shift to the side of restoring the abnormality degree is impossible without interrupting the power supply switch. As a result of such arrangement, an advantage is obtained such that safe driving can be done, and there is no confusion in the driving operation.

In the engine control system according to claim 2 of the invention, with respect to the engine speed in the operation mode before the shift, the engine speed after the shift is restrained from being sharply risen. As a result of such arrangement, an advantage is obtained such that switching of the operation mode is carried out smoothly.

In the engine control system according to claim 3 of the invention, in the case of any serious abnormality, the engine speed control is performed by fuel cut control of the variable engine speed in the first evacuation operation means. In the case of slight abnormality, in the second evacuation operation means, operation of the engine speed that is regulated more than during the normal operation by the throttle valve opening control made by means of the drive motor and by the fuel cut control to be a predetermined engine speed. As a result of such arrangement, the evacuation operation in response to the abnormality degree can be conducted.

In the engine control system according to claim 4 of the invention, even if any CPU abnormality occurs, the power supply circuit for the motor is interrupted by the first abnormality storage element, and runaway of the engine is prevented by the default mechanism that is a mechanical safe mechanism, and furthermore this state is not restored without interrupting the power supply switch. As a result of such arrangement, an advantage of securing safety is obtained.

Likewise, even when there arises any slight abnormality, the abnormality is once stored in the second abnormality storage element, and the abnormal state cannot be restored without interrupting the power supply switch even if the abnormality is a temporary one. As a result of such arrangement, an advantage is obtained such that there is no confusion in the driving operation due to random change in the evacuation operation means.

Furthermore, in the case of any serious abnormality or slight abnormality occurring due to the temporary abnormality in the control system, when stopping the vehicle once and starting it again, the abnormality storage means will be reset and the state can be restored to the normality.

In the engine control system according to claim 5 of the invention, the CPU is provided in the form of dual system so that processing function is distributed, and therefore reliability is improved. Furthermore a pair of accelerator position sensors and a pair of throttle position sensors are provided so as to be inputted to each CPU in a distributed manner. As a result of such arrangement, an advantage is obtained such that even if one of the sensors becomes abnormal, the other can be used resulting in improvement in reliability.

In the engine control system according to claim 6 of the invention, the runaway monitoring of the main CPU is performed by the external watchdog timer circuit. As a result of such arrangement, an advantage is obtained such that it becomes possible to monitor runaway of the main CPU and start it again even if there is any abnormality on the side of the sub CPU.

Furthermore, the abnormality, which is difficult to be determined only on the side of the sub CPU, is shared with the main CPU side. As a result of such arrangement, an advantage is obtained such that it is not necessary to transmit to the sub CPU side any complicated determination information, thus the system is simplified.

In the engine control system according to claim 7 of the invention, the drive control means and synthetic control abnormality detecting means are functionally shared between the main CPU and the sub CPU. As a result of such arrangement, the control safety is improved. Further, the overall control abnormality detecting means is constituted, in a distributed manner, of the first half control abnormality detecting means and the second half control abnormality detecting means. As a result of such arrangement, an advantage is obtained such that reliability in the detection of the synthetic control abnormality can be improved.

In the engine control system according to claims 8, 9, 10 of the invention, an advantage is obtained such that an abnormality is detected by various abnormality detecting means, an non-defective one of the accelerator position sensor and the throttle position sensor is selected, and the evacuation operation is performed by the first or second evacuation operation means using the selected sensor.

In the engine control system according to claim 11 of the invention, the slightest abnormality operation mode is provided in the second evacuation operation means. As a result of such arrangement, an advantage is obtained such that the driving operation thereof is the same two-pedal operation by means of the accelerator pedal and the brake pedal as in the normal driving operation, and there is no uncomfortable feeling in the driving operation. Furthermore the throttle valve opening is not suppressed, and therefore hill-climbing performance is not reduced much.

In addition, in the engine control system wherein the throttle valve opening is simply suppressed when any abnormality occurs, there may arise a problem in that the engine speed comes to be high during the light load, which makes it possible to drive at a high speed in spite of being in the state of abnormality. However, in the case that the engine speed is suppressed as in the invention, an advantage is obtained such that the vehicle speed regulation can be performed even during the light load, and that the engine output torque of full throttle determined by the regulated engine speed can be secured during climbing the hill.

In the engine control system according to claim 12 of the invention, the slight abnormality operation mode is provided in the second evacuation operation means. As a result of such arrangement, an advantage is obtained such that the driving operation is a two-pedal operation by means of the accelerator pedal and the brake pedal in the same manner as in the normal driving operation, and there is no uncomfortable feeling in the driving operation. Furthermore, as a result of such arrangement, the throttle valve opening is not suppressed, and therefore another advantage is obtained such that hill-climbing performance is not much reduced.

In addition, in the engine control system wherein the throttle valve opening is simply suppressed when any abnormality occurs, there may arise a problem in that the engine speed comes to be high during the light load, which makes it possible to drive at a high speed in spite of being in the state of abnormality. However, in the case that the engine speed is suppressed as in the invention, an advantage is obtained such that the vehicle speed regulation can be performed even during the light load, and that the engine output torque of full throttle determined by the regulated engine speed can be secured during climbing the hill.

Particularly, in the case of such type as to set the target vehicle speed by means of the accelerator position sensor, an advantage is obtained such that the maximum vehicle speed can be exactly regulated.

In the engine control system according to claim 13 of the invention, the slight abnormality operation mode is provided in the second evacuation operation means and is operated in the following manner. That is, even if any accelerator position sensor that has been regarded probably as a reliable one and has been selected is not perfectly normal, returning the accelerator pedal will cause the engine speed to be suppressed to the idle engine speed. As a result of such arrangement, safety is improved.

Alternatively, when any accelerator switch is not mounted or an accelerator switch is abnormal, upon returning the accelerator pedal, the engine speed is suppressed to a predetermined idle engine speed by the accelerator return detecting means operated by means of a pair of accelerator position sensors. As a result of such arrangement, safety is improved.

In the engine control system according to claim 14 of the invention, a serious abnormality operation mode is provided in the first evacuation operation means. As a result of such arrangement, even during the first evacuation operation in which control of the throttle valve opening cannot be performed, the evacuation operation is possible by a two-pedal actuation using the accelerator pedal and brake pedal. Furthermore, even if any accelerator position sensor that has been regarded probably as a reliable one and has been selected is not perfectly normal, returning the accelerator pedal will cause the engine speed to be suppressed to the idle engine speed. As a result of such arrangement, safety is improved.

Alternatively, when any accelerator switch is not mounted or an accelerator switch is abnormal, upon returning the accelerator pedal, the engine speed is suppressed to a predetermined idle engine speed by the accelerator return detecting means operated by means of a pair of accelerator position sensors. As a result of such arrangement, safety is improved.

In the engine control system according to claim 15 of the invention, under the most-serious abnormality operation mode in the first evacuation operation means, even in the case that a predetermined default return is not performed due to any abnormality in the throttle valve open/close mechanism, the engine output torque is surely regulated, and therefore an evacuation traveling becomes possible in response to the depression degree of the brake pedal.

Furthermore, the engine speed is regulated to be a further suppressed engine speed in the case of both throttle position sensors are abnormal. As a result of such arrangement, an advantage is obtained such that the evacuation travelling under the light load can be performed in response to the depression degree of the brake pedal.

In the engine control system according to claim 16 of the invention, under the most-serious abnormality operation mode in the first evacuation operation means, the operation of the side brake causes the engine speed to reduce to the idling engine speed. As a result of such arrangement, an advantage is obtained such that the vehicle can be surely stopped even on a down hill and the like, and the evacuation operation comes to be possible by a mutual switching for operation/release of the side brake.

In the engine control system according to claim 17 of the invention, the third alarm and display is provided. As a result of such arrangement, an advantage is obtained such that under the most-serious abnormality operation mode in the first evacuation operation means, the alarm and display means capable of displaying with sound or message, informs the driver that the operation is in the special operation mode by means of the brake pedal.

In the engine control system according to claim 18 of the invention, one of the CPUs is given a function capable of conducting the first evacuation operation. As a result of such arrangement, an advantage is obtained such that even if there exists any other CPU aiming at abnormality monitoring or throttle valve opening control, the evacuation operation comes to be possible irrespective of whether that CPU is defective or non-defective.

What is claimed is:

1. An engine control system comprising:

motor drive control means that is power fed via a power supply switch from a vehicle-mounted battery and controls an open/close driving motor of a throttle valve for an intake of the engine in response to an output from an accelerator position sensor for detecting a degree of a depression of an accelerator pedal and an output from a throttle position sensor for detecting a throttle valve opening;

fuel injection control means for the engine;

engine speed or vehicle speed detecting means; and a microprocessor (CPU); wherein said engine control system further comprising multi-stage abnormality detecting means, multi-stage evacuation operation means, and evacuation operation mode selection means;

wherein said abnormality detecting means is multi-stage abnormality detecting means bat regularly monitors operations of sensor system, control system and actuator system relating to a throttle valve control, and identifies and detects slight abnormality and serious abnormality depending on whether or not at least control of said actuator is possible;

said evacuation operation means is multi-stage evacuation operation means that responds to any abnormality result detected by said multi-stage abnormality detecting means, and comprises at least slight abnormality evacuation operation means and serious abnormality evacuation operation means; and wherein said evacuation operation mode selection means selects one of said multi-stage evacuation operation means so that shift from a normal operation when said slight abnormality or serious abnormality is not generated, to a side of getting worse in abnormality degree toward the slight abnormality evacuation operation or the serious abnormality evacuation operation may be possible, while shift to a return side in the abnormality degree may be impossible without interrupting said power supply switch.

2. The engine control system according to claim 1, further comprising smooth shift compensation means: wherein said smooth shift compensation means suppresses a sharp rise in the engine speed after the shift as compared with the engine speed in operation mode before the shift, at the time of shifting the operation mode toward said normal operation, slight abnormality evacuation operation and serious abnormality evacuation operation.

3. The engine control system according to claim 1, further comprising first or second throttle control means, first or second upper limit engine speed threshold setting means, first or second upper limit engine speed threshold computing means, fuel cut control means, first evacuation operation means as one of said serious abnormality evacuation operation means, and second evacuation operation means as one of said slight abnormality evacuation operation means: wherein said first throttle control means is applied when both of said accelerator position sensor and throttle position sensor are normal, and controls opening and closing of an air supply throttle valve by means of said driving motor so that an output detected by the normal throttle position sensor is substantially proportional to an output detected by the normal accelerator position sensor;

said second throttle control means is applied when said accelerator position sensor is normal while said throttle position sensor is abnormal, and controls the opening and closing of the air supply throttle valve by means of said driving motor so that an engine speed or vehicle speed detected by said engine speed or vehicle speed detecting means is substantially proportional to the output detected by the normal accelerator position sensor;

said first upper limit engine speed threshold setting means that selects and sets a predetermined engine speed not higher than a permissible maximum engine speed under the normal operation;

said second upper limit engine speed threshold setting means selects and sets a predetermined engine speed not higher than the engine speed set by said first upper limit engine speed threshold setting means;

said first upper limit engine speed threshold computing means is is applied when said accelerator position sensor is normal, and computes a target upper limit engine speed so that the engine speed is substantially proportional to the output detected by the normal accelerator position sensor and also an engine speed not higher than that set by said first upper limit engine speed threshold setting means;

said second upper limit engine speed threshold computing means is applied when said accelerator position sensor is abnormal and the throttle position sensor is normal, and computes the target upper limit engine speed so that the engine speed is substantially inversely proportional to the output detected by the normal throttle position sensor and also an engine speed not higher than that set by said first upper limit engine speed threshold setting means;

said fuel cut control means suppresses the fuel injection so that the engine speed detected by said engine speed detecting means is not higher than the engine speed to be the target;

said first evacuation operation means conducts the evacuation operation for controlling the engine speed by said fuel cut control means so that the engine speed computed by said first or second upper limit engine speed threshold computing means; or second upper limit engine speed threshold setting means may be the upper limit target engine speed; and said second evacuation operation means controls the engine speed by said fuel cut control means so that the engine speed set by said first upper limit engine speed threshold setting means may be the upper limit target engine speed, and carries out the evacuation operation at a variable engine speed by said first or second throttle control means.

4. The engine control system according to claim 3, further comprising switching means for switching the power supply, a default mechanism, first and second abnormality storage elements, first and second alarm displays, and a power supply detection circuit: wherein said switching means makes and breaks a feed circuit to and from an open/close driving motor of said throttle valve;

said default mechanism is an initial position return mechanism that returns a throttle valve opening to a predetermined position when said power supply of the motor is interrupted by said switching means;

said first abnormality storage element is arranged so as to store the occurrence of serious abnormality upon occurring the same; interrupt the feed circuit to the motor by said switching means, and at the same time determine an application of said first evacuation operation means to operate said first abnormality alarm display;

said second abnormality storage element stores the occurrence of slight abnormality upon occurring the same, determine the application of said second evacuation operation means, when said first abnormality storage element does not store the occurrence of abnormality, to operate said second abnormality alarm display;

said power supply detection circuit is arranged so as to generate a detection signal upon turning off or on of the power supply switch that conducts the operation and stop of the engine, and reset said first and second abnormality storage element; and even if the occurrence of abnormality is caused by any temporary noise malfunction, the abnormal state is not reset until the engine is stopped or started again.

5. The engine control system according to claim 3, wherein said microprocessor is comprised of a main CPU and a sub CPU that are capable of communicating with each other;

said drive control means, fuel injection control means and abnormality detecting means for detecting the serious abnormality or slight abnormality are arbitrarily shared between said main CPU and sub CPU, and at least a part of said abnormality detecting means and drive control means are shared by the respectively different CPUs; and said accelerator position sensor and throttle position sensor employ a pair of accelerator position sensors and a pair of throttle position sensors respectively so as to be inputted in a distributed manner to each CPU, and each CPU, in the case that the detection signal inputted from respective sensors is required at the other CPU, connects in a duplicate manner said sensor output as the input signal of each CPU, or transmits the output to a CPU on the required side.

6. The engine control system according to claim 5, further comprising runaway monitoring means for monitoring the main CPU, runaway monitoring means for monitoring the sub CPU, actuator system error signal output means, both accelerator position sensor abnormality detecting means, and overall control abnormality detecting means: wherein said runaway monitoring means monitors the main CPU and is the control abnormality detecting means for detecting said main CPU using a watchdog timer circuit that generates a first reset output for starting again the main CPU when a watchdog signal, being a pulse train generated by said main CPU is inputted, and a pulse width of said watchdog signal exceeds a predetermined value;

said runaway monitoring means for monitoring the sub CPU is the control abnormality detecting means for monitoring the sub CPU that is arranged by said main CPU so as to generate a second reset output for starting again the sub CPU; when the watchdog signal being a pulse train generated by said sub CPU is inputted and the pulse width of said watchdog signal exceeds a predetermined value;

said actuator system error signal output means detects an actuator system abnormality that is arranged to detect a disconnection or a short circuit on said driving motor and the feed circuit thereof to generate an error signal output;

said both accelerator position sensor abnormality detecting means detects the sensor system abnormality and is arranged so as to generate the error signal output when both of said pair of accelerator position sensors are abnormal;

said synthetic control abnormality detecting means detects an overall abnormality in the sensor system, the control system and the actuator system, and is arranged so as to generate a synthetic error signal output; when the output detected by one of said pair of accelerator position sensors is relatively compared with that from one of said pair of throttle position sensors and it is found by the comparison that a disagreement is excessively large; and said serious abnormality detecting means having a logical OR of said first and second reset outputs and said various error signal outputs.

7. The engine control system according to claim 6: wherein function of the system is shared such that said drive control means for the driving motor is implemented at either one of said main CPU or sub CPU, and said synthetic control abnormality detecting means is implemented mainly by the other CPU;

said synthetic control abnormality detecting means is dividedly comprised of first half control abnormality detecting means and second half control abnormality detecting means;

said first half control abnormality detecting means is arranged so as to compare whether or not first and second target throttle valve openings calculated at said main CPU and sub CPU based on each sensor output from said pair of accelerator position sensors, are substantially coincident, and generate a first half error signal output when it is found by the comparison that a disagreement is large;

said second half control abnormality detecting means compares and determines whether or not a compensation target values assuming a response delay of the throttle valve opening with respect to a target value of the target throttle valve opening on the side of actually controlling said driving motor, and an output value from said first or second throttle position sensor are substantially coincident, and generate a second half error signal output when it is determined by the comparison that a disagreement is large; and said synthetic error signal output is derived from a logical OR of said first half error signal output and second half signal output.

8. The engine control system according to claim 6, further comprising first and second relative abnormality detecting means, first and second individual abnormality detecting means and/or both throttle position sensor abnormality detecting means each serving as the slight abnormality detecting means, and further comprising fist and second non-defective sensor detecting means: wherein said first relative abnormality detecting means mutually comparing the outputs from said pair of accelerator position sensors and generating an error output when a comparative deviation is excessively large;

said second relative abnormality detecting means mutually comparing the outputs from said pair of throttle position sensors, and generating an error output when the comparative deviation is excessively large;

said first individual abnormality detecting means detecting whether or not there is any disconnection or short circuit in each of said pair of accelerator position sensors, and generating an error output when there is any abnormality;

said second individual abnormality detecting means detecting whether or not there is any disconnection or short circuit in each of said pair of throttle position sensors, and generating an error output when there is any abnormality;

said both throttle position sensor abnormality detecting means generating a both error output when both of said pair of throttle position sensors are abnormal;

said slight abnormality detecting means having a logical OR of said various error outputs and/or both error output;

said first non-defective sensor detecting means operating such that, when any relative abnormality is detected by said first relative abnormality detecting means and any disconnection and short circuit abnormality is detected at either one of the accelerator position sensors by said first individual abnormality detecting means, judges the other accelerator position sensor non-defective and selects it;

said second non-defective sensor detecting means operating such that, when any relative abnormality is detected by said second relative abnormality detecting means and any disconnection and short circuit abnormality is detected at either one of the throttle position sensors by said second individual abnormality detecting means, determines the other throttle position sensor is non-defective and selects it; and said non-defective sensor detected by said first and second non-defective sensor detecting means carries out the evacuation operation by said first or second evacuation operation means.

9. The engine control system according to claim 8, further comprising an accelerator switch that performs ON operation when the accelerator pedal is not depressed, and a third non-defective sensor detecting means: wherein said third non-defective sensor detecting means, when any relative abnormality of a pair of accelerator position sensors is detected by said first relative abnormality detecting means, neither of the accelerator position sensors is determined abnormal due to disconnection or short circuit by said first individual abnormality detecting means, and except when said accelerator switch is in the ON state, determines that the accelerator position sensor which is generating a predetermined detection output is non-defective and selects it, to serve as non-defective sensor detecting means for the accelerator position sensor that is added to said first non-defective sensor detecting means.

10. The engine control system according to claim 8, further comprising throttle valve opening estimate means for calculating a throttle valve opening as a function of engine speed and intake amount, and a fourth non-defective detecting means: wherein said fourth non-defective sensor detecting means, when any relative abnormality of a pair of the throttle position sensors is detected by said second relative abnormality detecting means and neither of the throttle position sensors is determined abnormal due to disconnection and short circuit by said second individual abnormality detecting means, determines that the throttle position sensor having substantially equivalent detection output to the throttle valve opening estimated by said throttle valve opening estimate means is non-defective, and selects it, to serve as non-defective sensor detecting means for the throttle position sensor that is added to said second non-defective sensor detecting means.

11. The engine control system according to claim 8, further comprising a slightest abnormality operation mode provided in said second evacuation operation means: wherein said slightest abnormality operation mode is an operation mode available when although any serious abnormality is not detected, one of a pair of accelerator position sensors and/or one of a pair of throttle position sensors is abnormal; and engine speed is regulated by said fuel cut control means so that the engine speed set by said first upper limit engine speed threshold setting means may be the upper limit target engine speed, and the evacuation operation at the variable engine speed using the accelerator pedal is performed by said first throttle control means.

12. The engine control system according to claim 8, further comprising a slight abnormality operation mode provided in said second evacuation operation means: wherein said slight abnormality operation mode is an operation mode available in the case that any serious abnormality is not detected, at least one of a pair of accelerator position sensors is regarded as being normal, but both of a pair of throttle position sensors are abnormal; and engine speed is regulated by said fuel cut control means so that the engine speed set by said first upper limit engine speed threshold setting means may be the upper limit target engine speed, and the evacuation operation at the variable engine speed using the accelerator pedal is performed by said second throttle control means.

13. The engine control system according to claim 12, further comprising accelerator return detecting means and idle engine speed threshold setting means both serving as the slight abnormality operation mode provided in said second evacuation operation means: wherein said accelerator return detecting means determines that the accelerator pedal is returned when the output detected from said accelerator switch, operating so long as the accelerator pedal is not depressed, or from a pair of the accelerator position sensors, is in the proximity of a predetermined value;

said idle engine speed threshold setting means selects and sets the target engine speed to the idle engine speed; and when said accelerator return detecting means detects the return of the accelerator pedal, irrespective of the output from said accelerator position sensor, the throttle valve opening is controlled so that the engine speed detected by said engine speed or vehicle speed detecting means may be a predetermined engine speed set by said idle engine speed threshold setting means.

14. The engine control system according to claim 8, further comprising:

a serious abnormality operation mode provided in said first evacuation operation means;

said serious abnormality operation mode being an operation mode available when at least one of said pair of accelerator position sensors is normal although any serious abnormality is detected;

accelerator return detecting means and idle engine speed threshold setting means;

said accelerator return detecting means for determining that the accelerator pedal is returned when an output detected from said accelerator switch operating during the accelerator pedal not being depressed or a pair of accelerator position sensors is in the proximity of a predetermined value;

said idle engine speed threshold setting means for setting the target engine speed to the idle engine speed; and wherein said serious abnormality operation mode controls the engine speed by said fuel cut control means so that the engine speed computed by said first upper limit engine speed threshold computing means may be the target engine speed, and when said accelerator return detecting means detects the return of the accelerator pedal, irrespective of the output from said accelerator position sensor, controls the engine speed by said fuel cut control means so that the engine speed detected by the engine speed detecting means may be a predetermined engine speed set by said idle engine speed threshold setting means, thereby eventually performing the evacuation operation at the variable engine speed using the accelerator pedal.

15. The engine control system according to claim 8, further comprising a most-serious abnormality operation mode provided in said first evacuation operation means: wherein said most-serious abnormality operation mode is an operation mode available when the serious abnormality is detected, and both of said pair of accelerator position sensors are abnormal; and said fuel cut control means performs a fuel injection control so that the target engine speed may be the threshold value computed by said second upper limit engine speed threshold computing means and, when there is no throttle position sensor regarded as non-defective, conducts a fuel injection control by the fuel cut control means so that the target engine speed may not be higher than a predetermined engine speed set by said second upper limit engine speed threshold setting means, thereby eventually performing the evacuation operation by operating the brake pedal with different strength.

16. The engine control system according to claim 15, further comprising a side brake operation detecting switch, idle engine speed threshold setting means and climb rate suppression means each serving as the most-serious abnormality operation mode provided in said first evacuation operation means: wherein said side brake operation detecting switch detects the operation of sub braking means that is added to main braking means operated by said brake pedal;

said idle engine speed threshold setting means setting the target engine speed when said side brake operation detecting switch is operated, to the idle engine speed and controlling the engine speed by said fuel cut control means; and said climb rate suppression means suppressing the rate of climb of the target engine speed from the engine speed set by said idle engine speed threshold setting means to that set by said second upper limit engine speed threshold computing means or second upper limit threshold setting means when said side brake is released and the operation detecting means is not operated, and by which the engine speed is controlled so as not to rise sharply upon releasing the side brake.

17. The engine control system according to claim 15, further comprising a third alarm and display: wherein said third alarm and display alarm and display that the evacuation operation is performed by operating the brake pedal with different strength in the most-serious abnormality operation mode within said first evacuation operation means.

18. The engine control system according to claim 15: wherein, in the most-serious abnormality operation mode in said first evacuation operation means, the non-defective determination of the throttle position sensor and the suppression control of the engine speed due to the fuel cut is performed on the side of the CPU including at least an engine drive control function, and the evacuation operation can be performed at one of the CPUs irrespective of whether the other CPU is defective or non-defective.

* * * * *